United States Patent
Held

(10) Patent No.: US 11,629,638 B2
(45) Date of Patent: Apr. 18, 2023

(54) THREE RESERVOIR ELECTRIC THERMAL ENERGY STORAGE SYSTEM

(71) Applicant: Supercritical Storage Company, Inc., Lewes, DE (US)

(72) Inventor: Timothy J. Held, Akron, OH (US)

(73) Assignee: SUPERCRITICAL STORAGE COMPANY, INC., Sussex County, DE (US)

( * ) Notice: Subject to any disclaimer, the term of this patent is extended or adjusted under 35 U.S.C. 154(b) by 0 days.

(21) Appl. No.: 17/546,963

(22) Filed: Dec. 9, 2021

(65) Prior Publication Data

US 2022/0178301 A1   Jun. 9, 2022

Related U.S. Application Data

(60) Provisional application No. 63/123,266, filed on Dec. 9, 2020.

(51) Int. Cl.
*F02C 1/10* (2006.01)
*F28D 20/00* (2006.01)
*F02C 6/14* (2006.01)

(52) U.S. Cl.
CPC .................. *F02C 1/10* (2013.01); *F02C 6/14* (2013.01); *F28D 20/00* (2013.01); *Y02E 60/14* (2013.01)

(58) Field of Classification Search
CPC ........ F02C 1/10; F02C 1/105; F02C 6/12–16; Y02E 60/14; F28D 20/00
See application file for complete search history.

(56) References Cited

U.S. PATENT DOCUMENTS

| | | |
|---|---|---|
| 1,433,883 A | 10/1922 | Friderich |
| 1,969,526 A | 2/1934 | Rosch |
| 2,575,478 A | 11/1951 | Wilson |
| 2,634,375 A | 4/1953 | Guimbal |

(Continued)

FOREIGN PATENT DOCUMENTS

| | | |
|---|---|---|
| CA | 2794150 A1 | 11/2011 |
| CN | 1165238 A | 11/1997 |

(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

(Continued)

*Primary Examiner* — Laert Dounis
(74) *Attorney, Agent, or Firm* — Nolte Lackenbach Siegel

(57) ABSTRACT

A method for operating a pumped thermal energy storage ("PTES") system includes circulating a working fluid through a working fluid circuit, the working fluid having a mass flow rate and a specific heat capacity and balancing a product of the mass and the specific heat capacity of the working fluid on a high-pressure side of a recuperator and a low side of the recuperator as the working fluid circulates through the working fluid circuit. The PTES system includes a bypass in the working fluid circuit by which a first portion of the working fluid bypasses the high-pressure side of the recuperator while a second portion of the working fluid circulates through the high-pressure side of the recuperator.

30 Claims, 6 Drawing Sheets

(56) References Cited

U.S. PATENT DOCUMENTS

| | | |
|---|---|---|
| 2,691,280 A | 10/1954 | Albert |
| 3,095,274 A | 6/1963 | Crawford |
| 3,105,748 A | 10/1963 | Stahl |
| 3,118,277 A | 1/1964 | Wormser |
| 3,237,403 A | 3/1966 | Feher |
| 3,277,955 A | 10/1966 | Laszlo |
| 3,310,954 A | 3/1967 | Sijtstra et al. |
| 3,401,277 A | 9/1968 | Larson |
| 3,620,584 A | 11/1971 | Rosensweig |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,828,610 A | 8/1974 | Swearingen |
| 3,830,062 A | 8/1974 | Morgan et al. |
| 3,831,381 A | 8/1974 | Swearingen |
| 3,939,328 A | 2/1976 | Davis |
| 3,971,211 A | 7/1976 | Wethe |
| 3,977,197 A | 8/1976 | Brantley, Jr. |
| 3,982,379 A | 9/1976 | Gilli |
| 3,986,359 A | 10/1976 | Manning et al. |
| 3,991,588 A | 11/1976 | Laskaris |
| 3,998,058 A | 12/1976 | Park |
| 4,003,786 A | 1/1977 | Cahn |
| 4,005,580 A | 2/1977 | Swearingen |
| 4,009,575 A | 3/1977 | Hartman, Jr. |
| 4,015,962 A | 4/1977 | Tompkins |
| 4,029,255 A | 6/1977 | Heiser |
| 4,030,312 A | 6/1977 | Wallin |
| 4,037,413 A | 7/1977 | Heller et al. |
| 4,049,407 A | 9/1977 | Bottum |
| 4,070,870 A | 1/1978 | Bahel |
| 4,071,897 A | 1/1978 | Groves, Jr. et al. |
| 4,089,744 A | 5/1978 | Cahn |
| 4,099,381 A | 7/1978 | Rappoport |
| 4,110,987 A | 9/1978 | Cahn et al. |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,178,762 A | 12/1979 | Binstock et al. |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,245,476 A | 1/1981 | Shaw |
| 4,248,049 A | 2/1981 | Briley |
| 4,257,232 A | 3/1981 | Bell |
| 4,285,203 A | 8/1981 | Vakil |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,364,239 A | 12/1982 | Chappelle et al. |
| 4,372,125 A | 2/1983 | Dickenson |
| 4,374,467 A | 2/1983 | Briley |
| 4,384,568 A | 5/1983 | Palmatier |
| 4,390,082 A | 6/1983 | Swearingen |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,445,180 A | 4/1984 | Davis |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,471,622 A | 9/1984 | Kuwahara |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,507,936 A | 4/1985 | Yoshino |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,665,975 A | 5/1987 | Johnson |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,884,942 A | 12/1989 | Pennink |
| 4,888,954 A | 12/1989 | Silvestri, Jr. |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,080,047 A | 1/1992 | Williams et al. |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,248,239 A | 9/1993 | Andrews |
| 5,291,509 A | 3/1994 | Mizoguchi et al. |
| 5,291,960 A | 3/1994 | Brandenburg |
| 5,320,482 A | 6/1994 | Palmer et al. |
| 5,321,944 A | 6/1994 | Bronicki et al. |
| 5,335,510 A | 8/1994 | Rockenfeller |
| 5,358,378 A | 10/1994 | Holscher |
| 5,360,057 A | 11/1994 | Rockenfeller |
| 5,384,489 A | 1/1995 | Bellac |
| 5,392,606 A | 2/1995 | Labinov |
| 5,440,882 A | 8/1995 | Kalina |
| 5,444,972 A | 8/1995 | Moore |
| 5,483,797 A | 1/1996 | Rigal et al. |
| 5,487,822 A | 1/1996 | Demaray et al. |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,544,479 A | 8/1996 | Yan et al. |
| 5,570,578 A | 11/1996 | Saujet |
| 5,588,298 A | 12/1996 | Kalina |
| 5,600,967 A | 2/1997 | Meckler |
| 5,609,465 A | 3/1997 | Batson et al. |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,685,152 A | 11/1997 | Sterling |
| 5,704,206 A | 1/1998 | Kaneko et al. |
| 5,738,164 A | 4/1998 | Hildebrand |
| 5,754,613 A | 5/1998 | Hashiguchi |

(56) References Cited

U.S. PATENT DOCUMENTS

| | | |
|---|---|---|
| 5,771,700 A | 6/1998 | Cochran |
| 5,782,081 A | 7/1998 | Pak et al. |
| 5,789,822 A | 8/1998 | Calistrat |
| 5,799,490 A | 9/1998 | Bronicki et al. |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,884,470 A | 3/1999 | Frutschi |
| 5,894,836 A | 4/1999 | Wu |
| 5,899,067 A | 5/1999 | Hageman |
| 5,901,783 A | 5/1999 | Dobak, III et al. |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,954,342 A | 9/1999 | Mikhalev et al. |
| 5,973,050 A | 10/1999 | Johnson |
| 6,037,683 A | 3/2000 | Lulay |
| 6,041,604 A | 3/2000 | Nicodemus |
| 6,058,695 A | 5/2000 | Ranasinghe |
| 6,058,930 A | 5/2000 | Shingleton |
| 6,059,450 A | 5/2000 | McClure |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,233,955 B1 | 5/2001 | Egara |
| 6,282,900 B1 | 9/2001 | Bell |
| 6,282,917 B1 | 9/2001 | Mongan |
| 6,295,818 B1 | 10/2001 | Ansley |
| 6,298,653 B1 | 10/2001 | Lawlor |
| 6,299,690 B1 | 10/2001 | Mongeon |
| 6,341,781 B1 | 1/2002 | Matz |
| 6,347,520 B1 | 2/2002 | Ranasinghe et al. |
| 6,374,630 B1 | 4/2002 | Jones |
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,490,812 B1 | 12/2002 | Bennett et al. |
| 6,530,224 B1 | 3/2003 | Conchieri |
| 6,539,720 B2 | 4/2003 | Rouse et al. |
| 6,539,728 B2 | 4/2003 | Korin |
| 6,563,855 B1 | 5/2003 | Nishi et al. |
| 6,571,548 B1 | 6/2003 | Bronicki |
| 6,581,384 B1 | 6/2003 | Benson |
| 6,588,499 B1 | 7/2003 | Fahlsing |
| 6,598,397 B2 | 7/2003 | Hanna |
| 6,644,062 B1 | 11/2003 | Hays |
| 6,657,849 B1 | 12/2003 | Andresakis |
| 6,668,554 B1 | 12/2003 | Brown |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,892,522 B2 | 5/2005 | Brasz et al. |
| 6,910,334 B2 | 6/2005 | Kalina |
| 6,918,254 B2 | 7/2005 | Baker |
| 6,921,518 B2 | 7/2005 | Johnston |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,962,056 B2 | 11/2005 | Brasz et al. |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,553 B2 | 4/2006 | Johnston |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,343,746 B2 | 3/2008 | Pierson |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,673,681 B2 | 3/2010 | Vinegar et al. |
| 7,685,820 B2 | 3/2010 | Litwin et al. |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,971,424 B2 | 7/2011 | Masada |
| 7,972,529 B2 | 7/2011 | Machado |
| 7,997,076 B2 | 8/2011 | Ernst |
| 8,015,790 B2 | 9/2011 | Zhang et al. |
| 8,096,128 B2 | 1/2012 | Held et al. |
| 8,099,198 B2 | 1/2012 | Gurin |
| 8,099,972 B2 | 1/2012 | Dupraz |

(56) References Cited

U.S. PATENT DOCUMENTS

| | | |
|---|---|---|
| 8,146,360 B2 | 4/2012 | Myers |
| 8,235,647 B2 | 8/2012 | Pisseloup et al. |
| 8,281,593 B2 | 10/2012 | Held |
| 8,289,710 B2 | 10/2012 | Spearing et al. |
| 8,297,065 B2 | 10/2012 | Vaisman et al. |
| 8,375,719 B2 | 2/2013 | Rhodes et al. |
| 8,387,248 B2 | 3/2013 | Rolt et al. |
| 8,419,936 B2 | 4/2013 | Berger et al. |
| 8,544,274 B2 | 10/2013 | Ernst |
| 8,584,463 B2 | 11/2013 | Hemrle et al. |
| 8,613,195 B2 | 12/2013 | Held et al. |
| 8,661,820 B2 | 3/2014 | Mak |
| 8,813,497 B2 | 8/2014 | Hart et al. |
| 8,820,083 B2 | 9/2014 | Davidson et al. |
| 8,869,531 B2 | 10/2014 | Held |
| 8,973,398 B2 | 3/2015 | Coyle |
| 9,038,390 B1 | 5/2015 | Kreuger |
| 9,180,421 B2 | 11/2015 | Kwang et al. |
| 9,523,312 B2 | 12/2016 | Allam et al. |
| 9,638,065 B2 | 5/2017 | Vermeersch et al. |
| 9,810,451 B2 | 11/2017 | O'Donnell et al. |
| 9,845,667 B2 | 12/2017 | Mokheimer et al. |
| 9,874,112 B2 | 1/2018 | Giegel |
| 9,932,861 B2 | 4/2018 | Preuss et al. |
| 10,077,683 B2 | 9/2018 | Close |
| 2001/0015061 A1 | 8/2001 | Viteri et al. |
| 2001/0020444 A1 | 9/2001 | Johnston |
| 2001/0027642 A1 | 10/2001 | Tsuji |
| 2001/0030952 A1 | 10/2001 | Roy |
| 2002/0029558 A1 | 3/2002 | Tamaro |
| 2002/0053196 A1 | 5/2002 | Lerner et al. |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2002/0148225 A1 | 10/2002 | Lewis |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2004/0247211 A1 | 12/2004 | Hamke |
| 2005/0022963 A1 | 2/2005 | Garrabrant et al. |
| 2005/0056001 A1 | 3/2005 | Frutschi |
| 2005/0072182 A1 | 4/2005 | Taniguchi et al. |
| 2005/0096676 A1 | 5/2005 | Gifford, III et al. |
| 2005/0109387 A1 | 5/2005 | Marshall |
| 2005/0118025 A1 | 6/2005 | Hiegemann et al. |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2005/0262848 A1 | 12/2005 | Joshi et al. |
| 2005/0276685 A1 | 12/2005 | Wiggins et al. |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0112702 A1 | 6/2006 | Martin et al. |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0222523 A1 | 10/2006 | Valentian et al. |
| 2006/0225421 A1 | 10/2006 | Yamanaka et al. |
| 2006/0225459 A1 | 10/2006 | Meyer |
| 2006/0249020 A1 | 11/2006 | Tonkovich et al. |
| 2006/0254281 A1 | 11/2006 | Badeer et al. |
| 2007/0001766 A1 | 1/2007 | Ripley et al. |
| 2007/0007771 A1 | 1/2007 | Biddle et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1* | 10/2007 | Pierson .............. F01K 25/08 60/645 |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0134681 A1 | 6/2008 | Nayef et al. |
| 2008/0135253 A1 | 6/2008 | Vinegar et al. |
| 2008/0163618 A1 | 7/2008 | Paul |
| 2008/0163625 A1 | 7/2008 | O'Brien |
| 2008/0173444 A1 | 7/2008 | Stone et al. |
| 2008/0173450 A1 | 7/2008 | Goldberg et al. |
| 2008/0174115 A1 | 7/2008 | Lambirth |
| 2008/0211230 A1 | 9/2008 | Gurin |
| 2008/0217321 A1 | 9/2008 | Vinegar et al. |
| 2008/0250789 A1 | 10/2008 | Myers et al. |
| 2008/0252078 A1 | 10/2008 | Myers |
| 2008/0282702 A1 | 11/2008 | Collins |
| 2008/0282715 A1 | 11/2008 | Aue et al. |
| 2009/0021251 A1 | 1/2009 | Simon |
| 2009/0071156 A1 | 3/2009 | Nishikawa et al. |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0179429 A1 | 7/2009 | Ellis et al. |
| 2009/0180903 A1 | 7/2009 | Martin et al. |
| 2009/0205892 A1 | 8/2009 | Jensen et al. |
| 2009/0211251 A1 | 8/2009 | Peterson et al. |
| 2009/0211253 A1 | 8/2009 | Radcliff et al. |
| 2009/0257902 A1 | 10/2009 | Ernens |
| 2009/0266075 A1 | 10/2009 | Westmeier et al. |
| 2009/0293503 A1 | 12/2009 | Vandor |
| 2009/0320477 A1 | 12/2009 | Juchymenko |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0143094 A1 | 6/2010 | Pisseloup et al. |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |

(56) References Cited

U.S. PATENT DOCUMENTS

| | | |
|---|---|---|
| 2010/0205962 A1 | 8/2010 | Kalina |
| 2010/0212316 A1 | 8/2010 | Waterstripe et al. |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287920 A1 | 11/2010 | Duparchy |
| 2010/0287934 A1 | 11/2010 | Glynn et al. |
| 2010/0300093 A1 | 12/2010 | Doty |
| 2010/0319346 A1 | 12/2010 | Ast et al. |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0051880 A1 | 3/2011 | Al-Mayahi et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0100002 A1 | 5/2011 | Muir et al. |
| 2011/0100611 A1 | 5/2011 | Ohler et al. |
| 2011/0113781 A1 | 5/2011 | Frey et al. |
| 2011/0164957 A1 | 7/2011 | Rivas et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0214424 A1 | 9/2011 | Wood |
| 2011/0219760 A1 | 9/2011 | McBride et al. |
| 2011/0259010 A1 | 10/2011 | Bronicki et al. |
| 2011/0270451 A1 | 11/2011 | Sakaguchi et al. |
| 2011/0286724 A1 | 11/2011 | Goodman |
| 2011/0288688 A1 | 11/2011 | Lehan |
| 2011/0299972 A1 | 12/2011 | Morris |
| 2011/0308253 A1 | 12/2011 | Ritter |
| 2012/0042650 A1 | 2/2012 | Ernst et al. |
| 2012/0047892 A1* | 3/2012 | Held .................. F01K 7/08 60/660 |
| 2012/0055153 A1 | 3/2012 | Murata et al. |
| 2012/0067046 A1 | 3/2012 | Drenik et al. |
| 2012/0067055 A1 | 3/2012 | Held |
| 2012/0111003 A1 | 5/2012 | Kasuya et al. |
| 2012/0125002 A1 | 5/2012 | Lehar et al. |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0167873 A1 | 7/2012 | Venetos et al. |
| 2012/0174558 A1 | 7/2012 | Gurin |
| 2012/0186219 A1 | 7/2012 | Gurin |
| 2012/0240616 A1 | 9/2012 | Ritter et al. |
| 2012/0247134 A1 | 10/2012 | Gurin |
| 2012/0247455 A1 | 10/2012 | Gurin et al. |
| 2012/0255304 A1 | 10/2012 | Li et al. |
| 2012/0261090 A1 | 10/2012 | Durmaz et al. |
| 2012/0261104 A1 | 10/2012 | Kelly et al. |
| 2012/0306206 A1 | 12/2012 | Agrawal et al. |
| 2012/0319410 A1 | 12/2012 | Ambrosek et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0074497 A1 | 3/2013 | Mori et al. |
| 2013/0087301 A1 | 4/2013 | Hemrle et al. |
| 2013/0113221 A1 | 5/2013 | Held |
| 2013/0134720 A1 | 5/2013 | Fukasaku et al. |
| 2013/0145759 A1 | 6/2013 | Sonwane et al. |
| 2014/0041387 A1 | 2/2014 | Benson |
| 2014/0090405 A1 | 4/2014 | Held et al. |
| 2014/0102098 A1 | 4/2014 | Bowan et al. |
| 2014/0102103 A1 | 4/2014 | Yamamoto et al. |
| 2014/0150992 A1 | 6/2014 | Koontz et al. |
| 2014/0208750 A1 | 7/2014 | Vermeersch |
| 2014/0208751 A1 | 7/2014 | Bowan |
| 2014/0216034 A1 | 8/2014 | Numata et al. |
| 2014/0223907 A1 | 8/2014 | Fujioka et al. |
| 2014/0224447 A1 | 8/2014 | Reznik et al. |
| 2015/0069758 A1 | 3/2015 | Davidson et al. |
| 2015/0369086 A1 | 12/2015 | Johnson et al. |
| 2016/0003108 A1* | 1/2016 | Held .................. F01K 25/103 60/517 |
| 2016/0017759 A1 | 1/2016 | Gayawal et al. |
| 2016/0040557 A1 | 2/2016 | Vermeersch et al. |
| 2016/0102608 A1 | 4/2016 | Lynn |
| 2016/0237904 A1 | 8/2016 | Scarboro et al. |
| 2017/0058202 A1 | 3/2017 | Noureldin et al. |
| 2017/0350658 A1 | 12/2017 | Kerth et al. |
| 2017/0362963 A1 | 12/2017 | Hostler et al. |
| 2018/0187597 A1* | 7/2018 | Apte .................. F01K 7/16 |
| 2018/0187628 A1 | 7/2018 | Apte |
| 2018/0340712 A1 | 11/2018 | Peter et al. |
| 2019/0170026 A1 | 6/2019 | Matsukuma et al. |
| 2020/0003081 A1* | 1/2020 | Held .................. F01K 7/16 |

FOREIGN PATENT DOCUMENTS

| | | |
|---|---|---|
| CN | 1432102 A | 7/2003 |
| CN | 201181133 | 1/2009 |
| CN | 101614139 A | 12/2009 |
| CN | 202055876 U | 11/2011 |
| CN | 202544943 U | 11/2012 |
| CN | 202718721 U * | 2/2013 |
| DE | 2632777 A | 2/1977 |
| DE | 19906087 A1 | 8/2000 |
| DE | 10052993 A1 | 5/2002 |
| DE | 102007020086 B3 | 4/2007 |
| DE | 102011005722 B3 | 3/2011 |
| EP | 0003980 A1 | 2/1979 |
| EP | 0286565 A2 | 4/1998 |
| EP | 1484489 A2 | 8/2004 |
| EP | 1577549 A1 | 9/2005 |
| EP | 1977174 A2 | 10/2008 |
| EP | 1998013 A2 | 12/2008 |
| EP | 2157317 A2 | 2/2010 |
| EP | 2241737 A1 | 10/2010 |
| EP | 2312129 A1 | 4/2011 |
| EP | 2357324 A2 | 9/2011 |
| EP | 2390473 A1 | 11/2011 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A1 | 1/2013 |
| EP | 2698506 A1 | 2/2014 |
| GB | 856985 A | 12/1960 |
| GB | 2010974 A | 7/1979 |
| GB | 2075608 A | 11/1981 |
| JP | 58-193051 A | 11/1983 |
| JP | 60-040707 A | 3/1985 |
| JP | 61-152914 A | 7/1986 |
| JP | 01-240705 A | 9/1989 |
| JP | H03182638 A | 8/1991 |
| JP | 05-321612 A | 12/1993 |
| JP | 05-321648 A | 12/1993 |
| JP | 06-331225 A | 11/1994 |
| JP | 08-028805 A | 2/1996 |
| JP | 09-100702 A | 4/1997 |
| JP | 2641581 B2 | 5/1997 |
| JP | 09-209716 A | 8/1997 |
| JP | 2858750 B2 | 12/1998 |
| JP | H11-270352 | 5/1999 |
| JP | 2000-257407 A | 9/2000 |
| JP | 3119718 B2 | 12/2000 |
| JP | 2001-193419 A | 7/2001 |
| JP | 2002-097965 A | 4/2002 |
| JP | 2003-529715 A | 10/2003 |
| JP | 2004-239250 A | 8/2004 |
| JP | 2004-332626 A | 11/2004 |
| JP | 2005-030727 A | 2/2005 |
| JP | 2005-533972 A1 | 11/2005 |
| JP | 2006-037760 A | 2/2006 |
| JP | 2006-177266 A | 7/2006 |
| JP | 2007-198200 A | 9/2007 |
| JP | 4343738 B2 | 10/2009 |

(56) References Cited

FOREIGN PATENT DOCUMENTS

| | | |
|---|---|---|
| JP | 2011-017268 A | 1/2011 |
| KR | -100191080 | 6/1999 |
| KR | 10 2007 0086244 A | 8/2007 |
| KR | 10-0766101 B1 | 10/2007 |
| KR | 10-0844634 A | 7/2008 |
| KR | 10-20100067927 A | 6/2010 |
| KR | 1020110018769 A | 2/2011 |
| KR | 1069914 B1 | 9/2011 |
| KR | 1103549 B1 | 1/2012 |
| KR | 10-2012-0058582 A | 6/2012 |
| KR | 2012-0068670 A | 6/2012 |
| KR | 2012-0128753 A | 11/2012 |
| KR | 2012-0128755 A | 11/2012 |
| WO | WO 1991/05145 A1 | 4/1991 |
| WO | WO 92/12366 A1 | 7/1992 |
| WO | WO 1996/009500 A1 | 3/1996 |
| WO | WO 00-71944 A1 | 11/2000 |
| WO | WO 2001/044658 A1 | 6/2001 |
| WO | WO 02/090721 A1 | 11/2002 |
| WO | WO 02/090747 A2 | 11/2002 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2007/116299 A | 10/2007 |
| WO | WO 2008/014774 A2 | 2/2008 |
| WO | WO 2008/039725 A2 | 4/2008 |
| WO | WO 2008/101711 A2 | 8/2008 |
| WO | WO 2009/045196 A1 | 4/2009 |
| WO | WO 2009/058992 A2 | 5/2009 |
| WO | WO 2010/017981 A1 | 2/2010 |
| WO | WO 2010/017981 A2 | 2/2010 |
| WO | WO 2010/017981 A3 | 2/2010 |
| WO | WO 2010/074173 A1 | 7/2010 |
| WO | WO 2010/083198 A1 | 7/2010 |
| WO | WO 2010/121255 A1 | 10/2010 |
| WO | WO 2010/126980 A2 | 11/2010 |
| WO | WO 2010/151560 A1 | 12/2010 |
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/027688 A1 | 3/2012 |
| WO | WO 2012/047889 A1 | 3/2012 |
| WO | WO 2012/047889 A2 | 4/2012 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |
| WO | WO 2014/164620 A1 | 3/2014 |
| WO | WO 2014/114531 A1 | 7/2014 |
| WO | WO 2014/138035 A1 | 9/2014 |
| WO | WO 2014/159520 A1 | 10/2014 |
| WO | WO 2016/150455 A1 | 9/2016 |
| WO | WO 2018/217969 A1 | 11/2018 |
| WO | WO-2018225923 A1 * 12/2018 ............ F01K 15/04 |
| WO | WO 2020/90721 A1 | 7/2020 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chinese Search Report for Application No. 201080035382.1, 2 pages.

Chinese Search Report for Application No. 201080050795.7, 2 pages.

Chordia, Lalit, "Optimizing Equipment for Supercritical Applications", Thar Energy LLC, Supercritical CO2 Power Cycle Symposium, May 24-25, 2011, Boulder, CO, 7 pages.

Colegrove, et al., "Structured Steam Turbines for the Combined-Cycle Market", GE Power Systems, GER-4201, 05/01, 18 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages., (7 parts).

Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Ebenezer, Salako A.; "Removal of Carbon Dioxide from Natural Gas for LNG Production", Institute of Petroleum Technology Norwegian University of Science and Technology, Dec. 2005, Trondheim, Norway, 74 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G., et al., "Investigation of Supercritical (Feher) Cycle", Astropower Laboratory, Missile & Space Systems Division, Oct. 1968, 152 pages.

Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.

Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

(56) References Cited

OTHER PUBLICATIONS

Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.
Gowrishankar, K., "Adaptive Fuzzy Controller to Control Turbine Speed", Rajiv Gandhi College of Engg. & tech., Puducherry, India, 7 pages.
Hjartarson, Heimir; "Waste Heat Utilization at Elkem Ferrosilicon Plant in Iceland", University of Iceland, 2009, 102 pages.
Hjartarson, et al.; "Waste Heat Utilization from a Submerged ARC Furnace Producing Ferrosilicon", The Twelfth International Ferroalloys Congress Sustainable Future; , Helsinki, Finland Jun. 6-9, 2010, 10 pages.
Hejzlar, P. et al., "Assessment of Gas Cooled Gas Reactor with Indirect Supercritical CO2 Cycle" Massachusetts Institute of Technology, Jan. 2006, 10 pages.
Hoffman, John R., and Feher, E.G., "150 kwe Supercritical Closed Cycle System", Transactions of the ASME, Jan. 1971, pp. 70-80.
Jeong, Woo Seok, et al., "Performance of S—CO2 Brayton Cycle with Additive Gases for SFR Application", Korea Advanced Institute of Science and Technology, Supercritical CO2 Power Cycle Symposium, May 24-25, 2011, Boulder, CO, 5 pages.
Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.
Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).
Kulhanek, Martin, "Thermodynamic Analysis and Comparison of S—CO2 Cycles", Presentation, Czech Technical University in Prague, Supercritical CO2 Power Cycle Symposium, May 24-25, 2011, Boulder, CO, 14 pages.
Kulhanek, Martin, "Thermodynamic Analysis and Comparison of S—CO2 Cycles", Paper, Czech Technical University in Prague, Supercritical CO2 Power Cycle Symposium, May 24-25, 2011, Boulder, CO, 7 pages.
Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.
Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.
Mohamed, Omar, et al., "Modelling Study of Supercritical Power Plant and Parameter Identified Using Genetic Algorithms", Proceedings of the World Congress on Engineering 2010 vol. II, WCE 2010, Jun. 30-Jul. 2, 2010, London, U.K., 6 pages.
Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.
Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.
Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.
Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.
Muto, Yasushi, and Kato, Yasuyoshi, "Optimal Cycle Scheme of Direct Cycle Supercritical CO2 Gas Turbine for Nuclear Power Generation Systems", International Conference on Power Engineering-2007, Oct. 23-27, 2007, Hangzhou, China, pp. 86-87.
Noriega, Bahamonde J.S., "Design Method for s—CO2 Gas Turbine Power Plants", Master of Science Thesis, Delft University of Technology, Oct. 2012, 122 pages., (3 parts).
Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, Ed, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, Ed, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/039559—Notification of Transmittal of the International Search Report and Written Opinion of the International Searching Authority, or the Declaration dated Sep. 1, 2010, 6 pages.
PCT/US2010/044681—International Search Report and Written Opinion dated Oct. 7, 2010, 10 pages.
PCT/US2010/044681—International Preliminary Report on Patentability dated Feb. 16, 2012, 9 pages.
PCT/US2010/044476—International Search Report dated Sep. 29, 2010, 23 pages.
PCT/US2007/001120—International Search Report dated Apr. 25, 2008, 7 pages.
PCT/US2006/049623—Written Opinion of ISA dated Jan. 4, 2008, 4 pages.
PCT/US2007/079318—International Preliminary Report on Patentability dated Jul. 7, 2008, 5 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/023026—Notification of Transmittal of the International Search Report and the Written Opinion of the International Searching Authority, or the Declaration dated Jul. 22, 2014, 11 pages.
PCT/US2014/013170—Notification of Transmittal of the International Search Report and the Written Opinion of the International Searching Authority, or the Declaration dated May 9, 2014, 12 pages.

(56) References Cited

OTHER PUBLICATIONS

PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062198—Extended European Search Report dated May 6, 2014, 9 pages.
PCT/US2011/062201—International Search Report and Written Opinion dated Jun. 26, 2012, 9 pages.
PCT/US2011/062201—Extended European Search Report dated May 28, 2014, 8 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2014/013154—International Search Report dated May 23, 2014, 4 pages.
PCT/US2014/024548—International Search Report and Written Opinion dated Sep. 5, 2014, 11 pages.
PCT/US2013/064475—International Search Report and Written Opinion dated Jan. 16, 2014, 11 pages.
PCT/US2014/024254—International Search Report and Written Opinion dated Aug. 13, 2014, 10 pages.
PCT/US2014/026173—Notification of Transmittal of the International Search Report and the Written Opinion of the International Searching Authority, or the Declaration dated Jul. 9, 2014, 10 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
PCT/US2014/024305—Notification of Transmittal of the International Search Report and the Written Opinion of the International Searching Authority, or the Declaration dated Aug. 26, 2014, 11 pages.
PCT/US2014/023990—Notification of Transmittal of the International Search Report and the Written Opinion of the International Searching Authority, or the Declaration dated Jul. 17, 2014, 10 pages.
PCT/US2015/57701—Notification of Transmittal of the International Search Report and the Written Opinion of the International Searching Authority, or the Declaration dated Dec. 22, 2015, 11 pages.
PCT/US2015/57756—Notification of Transmittal of the International Search Report and the Written Opinion of the International Searching Authority, or the Declaration dated Jul. 27, 2017, 41 pages.
PCT/US2014/020242—Notification of Transmittal of the International Search Report and the Written Opinion of the International Searching Authority, or the Declaration dated Aug. 5, 2014, 9 pages.
PCT/US2018/034289—Notification of Transmittal of the International Search Report and the Written Opinion of the International Searching Authority, or the Declaration dated Oct. 2, 2018, 22 pages.
"Steam Turbines", PDHengineer.com Course No. M-3006.
Steam Turbines (Energy Engineering) http://what-when-how.com/energy-engineering/steam-turhines-energy-engineering/, Oct. 25, 2012, 14 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Pruess, Karsten, "Enhanced Geothermal Systems (EGS): Comparing Water and CO2 as Heat Transmission Fluids", Proceedings, New Zealand Geothermal Workshop 2007 Auckland, New Zealand, Nov. 19-21, 2007, 13 pages.
Pruess, Karsten, "Enhanced Geothermal Systems (EGS): Using CO2 as Working Fluid—a Novel Approach for Generating Renewable Energy with Simultaneous Sequestration of Carbon", Submitted to Geothermics, Jun. 2006, 26 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S—CO2 Power Cycle with Reheating" Energy Conversion and Management 50 (May 17, 2009), pp. 1939-1945.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.
Tom, Samsun Kwok Sun, "The Feasibility of Using Supercritical Carbon Dioxide as a Coolant for the Candu Reactor", The University of British Columbia, Jan. 1978, 156 pages.
"Two-flow rotors"; http://www.answers.com/topic/steam-turbine#ixzz2AJsKAwHX.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical C02 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.

\* cited by examiner

THREE RESERVOIR ELECTRIC THERMAL ENERGY STORAGE SYSTEM

CROSS-REFERENCE TO RELATED APPLICATIONS

This application claims priority to U.S. Prov. Appl. No. 63/123,266, entitled "3-Reservoir ETES System", filed Dec. 9, 2020, in the name of Timothy Held. This application is incorporated herein by reference in its entirety for all purposes, including the right of priority, as if set forth verbatim herein.

TECHNICAL FIELD

This present disclosure is directed to an electric thermal energy storage ("ETES") system and, more particularly, to a carbon dioxide ("$CO_2$")-based pumped thermal energy storage ("PTES") system.

BACKGROUND

PTES systems, sometimes also known as electro-thermal energy storage systems, are used to store and re-generate energy. PTES systems generally use a configurable thermodynamic cycle where thermal energy is transferred between a high-temperature reservoir and a low-temperature reservoir via working fluid in a working fluid circuit. In its simplest version, a PTES consists of a thermodynamic cycle that operates as a heat pump in one direction of thermal and fluid flow, and operates as a heat engine in the opposite direction of thermal and fluid flow, where thermal energy is transferred between two reservoirs, one at high temperature and the other at low temperature as shown in FIG. 1A. The operation of a PTES can be broadly described as including a "charging" phase and a "generating" phase.

During the "charging" phase of operation, thermal energy is upgraded from a low-temperature reservoir ("LTR") to a high-temperature reservoir ("HTR") by using the heat pump cycle in the nominally forward direction. During this process, an electrical motor is used to drive a gas compressor, which increases the working fluid pressure and temperature. The thermal energy contained in the working fluid is transferred to the high-temperature reservoir ("HTR") by using an indirect heat exchanger. Further thermal energy is transferred from the working fluid downstream of the indirect heat exchanger to the fluid upstream of the gas compressor in a recuperator heat exchanger. The fluid is then expanded through a turbine, which produces shaft work that is used to help drive the compressor. The working fluid at the turbine exit is lower pressure, and much lower temperature. Heat is transferred from the low-temperature reservoir ("LTR") to the working fluid, which brings it back to the initial state at the compressor inlet.

During the "generating" phase of operation, the directions of fluid and heat flows are reversed. The fluid exiting the LTR is compressed, but now the "compressor" inlet and outlet temperatures are much lower—in fact, for the carbon dioxide ($CO_2$)-based version of the system, the fluid may be at the liquid state, and thus the "compressor" is actually a pump. The fluid is then heated to a relatively high-temperature by the HTR, and expanded through a turbine, producing shaft work. This turbine work now exceeds the compressor work, and the excess is converted to electrical power by a generator and fed back into the electrical grid. Residual thermal energy at the turbine discharge is transferred to the working fluid upstream of the HTR in the recuperator heat exchanger.

SUMMARY

The technique disclosed herein reduces the impact of the heat capacity mismatch across a recuperator and thereby avoid the lost exergy associated with a temperature-heat transferred ("TQ") slope mismatch described below. The presently disclosed technique also markedly improves cycle performance. As used herein, "exergy" is the maximum useful work possible during a process that brings the system into equilibrium with a heat reservoir.

The presently disclosed technique includes a method and an apparatus. A method for operating a pumped thermal energy storage ("PTES") system includes circulating a working fluid through a working fluid circuit, the working fluid having a mass flow rate and a specific heat capacity and balancing a product of the mass and the specific heat capacity of the working fluid on a high-pressure side of a recuperator and a low side of the recuperator as the working fluid circulates through the working fluid circuit. The PTES system includes a bypass in the working fluid circuit by which a first portion of the working fluid bypasses the high-pressure side of the recuperator while a second portion of the working fluid circulates through the high-pressure side of the recuperator.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

One metric of overall cycle performance is the "round-trip efficiency" ("RTE"). This parameter defines the amount of electrical energy (kWh) that can be produced during the generating phase divided by the amount of electrical energy that was consumed during the charging phase. The other key performance parameter is system capital cost, which can be defined in terms of generating capacity or in terms of storage capacity.

Figure 1A:
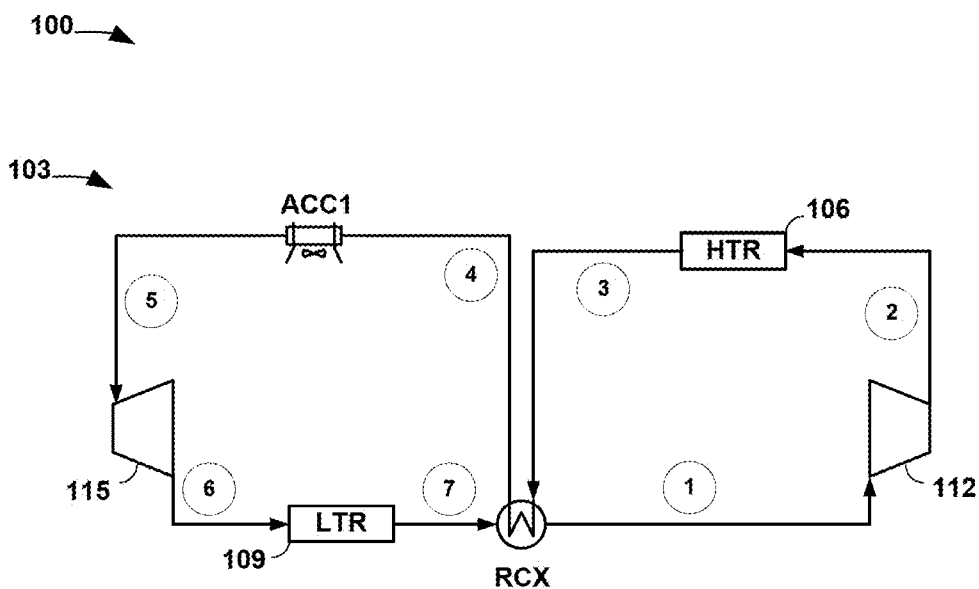
FIG. 1A is a process flow diagram for a prior art PTES system during a charging phase of a PTES operational cycle.
Figure 1B:
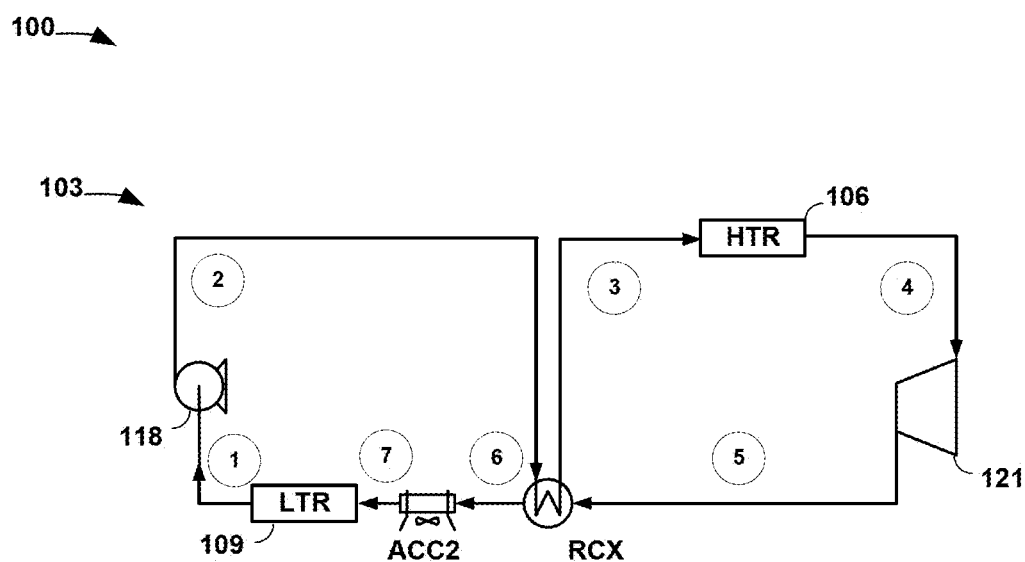
FIG. 1B is a process flow diagram for a prior art PTES system during a generating phase of a PTES operational cycle.
Figure 2:
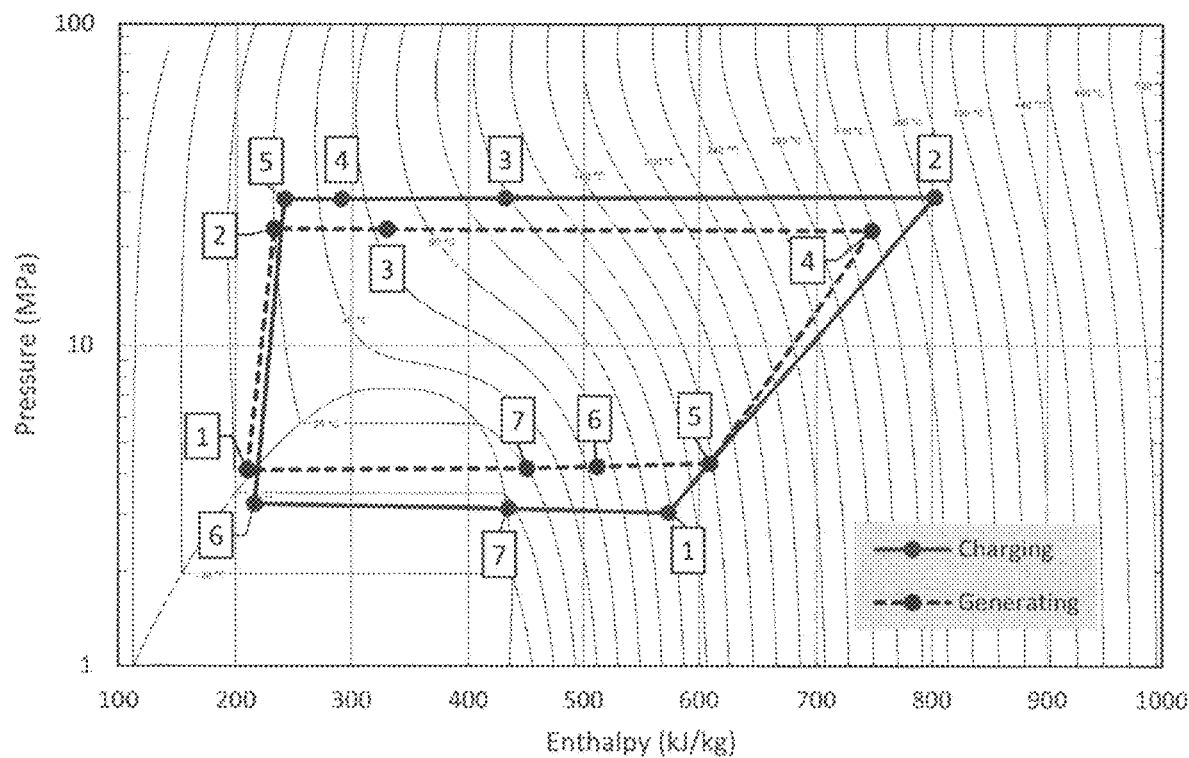
FIG. 2 is a pressure-enthalpy diagram for baseline PTES cycle including numbers in boxes that are state points for the generating phase for the prior PTES system of FIG. 1A-FIG. 1B.

FIG. 1A and FIG. 1B illustrate a prior art PTES system 100 with a PTES operating cycle whose pressure-enthalpy diagram is shown in FIG. 2. Working fluid states indicated in FIG. 2 in boxes are indicated in FIG. 1A-FIG. 1B in circles. Thus, the operating states at various points in the operational cycle of the PTES system 100 can be mapped from the pressure-enthalpy diagram of FIG. 2 to the process flow diagrams of FIG. 1A-FIG. 1B. FIG. 1A illustrates a charging phase of the operating cycle while FIG. 1B illustrates a generating phase of the operating cycle. In the following discussions and the accompanying drawings, the nomenclature set forth in Table 1 shall be used.

TABLE 1

Nomenclature

| Acronym | Meaning |
| --- | --- |
| ACC | Air-cooled cooler |
| HTR | High-temperature reservoir |
| HTX | High-temperature reservoir to $CO_2$ heat exchanger |
| LPT | Low-pressure turbine |
| LTR | Low-temperature reservoir |
| LTX | Low-temperature reservoir to $CO_2$ heat exchanger |
| MTR | Medium-temperature reservoir |
| MTX | Medium-temperature reservoir to $CO_2$ heat exchanger |
| PFD | Process flow diagram |
| PTES | Pumped thermal energy storage |
| RCX | Recuperator heat exchanger |
| RTE | Round-trip efficiency |

The PTES system 100 includes a working fluid circuit 103, a HTR 106, a LTR 109 and a recuperator RCX. The configuration of the working fluid circuit 103 depends, in part, on whether the PTES system 100 is in the charging phase or the generating phase of the operational cycle. As those in the art having the benefit of this disclosure will appreciate, the configuration is generally a function of programmed control of fluid flow valves. Thus, in the charging phase some components of the working fluid circuit 103 are switched in and some are switched out by controlling the flow of the working fluid through the working fluid circuit 103. Similarly, in the generating phase, other components may be switched in and other components out, again by controlling the flow of the working fluid through the working fluid circuit 103. The fluid flow valves and controller(s) therefore are omitted in FIG. 1A-FIG. 1B for the sake of clarity.

In the charging phase, as shown in FIG. 1A, the working fluid circuit 103 includes an expander 115, a charge compressor 112, and an air-cooled cooler ACC1 between the recuperator RCX and the expander 115. The expander 115 is used for expansion processes in which the working fluid is expanded. The charge compressor 112 is used for compression processes in which the working fluid is compressed. In the generating phase, shown in FIG. 1B, the working fluid circuit 103 includes a pump 118 for compression processes. Similarly, the working fluid circuit 103 includes a power turbine 121 in the generating phase. Furthermore, the working fluid circuit 103 omits the air-cooled cooler ACC1 from the charging phase and in the generating phase includes an air-cooled cooler ACC2. The air-cooled cooler ACC2 is positioned between the LTR 109 and the recuperator RCX.

In the presently used nomenclature, "high-temperature" and "low-temperature" are relative to one another—that is, the HTR operates at temperatures higher than the temperatures at which the LTR operates. The terms "hot" and "cold" are used relative to one another. For instance, the HTR 106 may operate at temperatures ranging from 100 to 340° C. and the LTR 109 may operate at temperatures ranging from −2 to 2° C. depending on the embodiment.

In the charging phase, shown in FIG. 1A, heat transfers from the LTR 109 to the working fluid and heat transfers from the working fluid to the HTR 106, respectively. In the generating phase, shown in FIG. 1B, heat transfer occurs in the opposite direction. Heat transfers from the working fluid to the LTR 109 and heat transfers to the working fluid from the HTR 106, respectively.

Unlike a traditional heat engine, in a theoretical ideal cycle with 100% efficient turbomachinery, no pressure losses, and perfectly matched temperatures through the heat exchangers, the RTE of the PTES process is 100%. In practice, thermodynamic irreversibilities, pressure losses and finite temperature approaches through the heat exchangers result in lower RTE values. For the charging phase of the baseline cycle depicted in FIG. 1A, using carbon dioxide ("$CO_2$") and a reasonable set of efficiency values, etc., one can calculate an RTE of 50-55%.

Thermodynamic irreversibilities, for example, can introduce inefficiency. Thermodynamically ideal compression and expansion processes are described as "adiabatic, isentropic" devices. In FIG. 2, the expansion and compression processes are represented by the diagonal lines—for example, from State 4 to 5 in the generating phase. The term "isentropic" refers to a constant entropy process. In the non-ideal case shown, the compression process is non-isentropic, thus showing a shallower slope when increasing pressure than does the corresponding generation expansion process. Due to these irreversibilities, the compression process consumes more work than the expansion process returns.

Inefficiency is also incurred in circulating the working fluid. The pressure losses during the heat addition and rejection processes (e.g., State 7 to State 1 in the generating process) represent work lost in circulating fluid through the heat exchangers and piping. Thus, the basic act of circulating the working fluid itself causes inefficiencies.

Furthermore, finite temperature differences between the working fluid and the thermal storage media are required to drive heat transfer between the two materials. Because the direction of heat transfer reverses between the charging phase and the generating phase, and because the reservoir material temperatures are fixed, the working fluid temperatures during charging need to be higher than the HTR and lower than the HTR, while during generating they need to be lower than the HTR and higher than the HTR. These temperature differentials represent lost thermodynamic potential, which reduce the round-trip efficiency of the system.

Still further, the PTES system 100 utilizes internal heat transfer, also known as "recuperation". This process is represented in the PTES system 100 by the recuperator RCX. Recuperation is used to elevate the temperature of the working fluid entering the compressor 112 during the charge cycle while also lowering the temperature of the working fluid entering the power turbine 115. Conversely, during the generation cycle, the PTES system 100 uses recuperation to preheat the working fluid before entering the HTR 106 by extracting residual heat from the turbine 121 exhaust.

The heat transfer between the working fluid and the LTR 109 and the working fluid and the HTR 106 occurs through a heat exchanger of the respective thermal reservoir. The heat exchanger is not shown for the sake of clarity. The heat transfer process through a heat exchanger can be illustrated in a temperature-heat transferred plot, also known as a "TQ plot".

Figure 3:
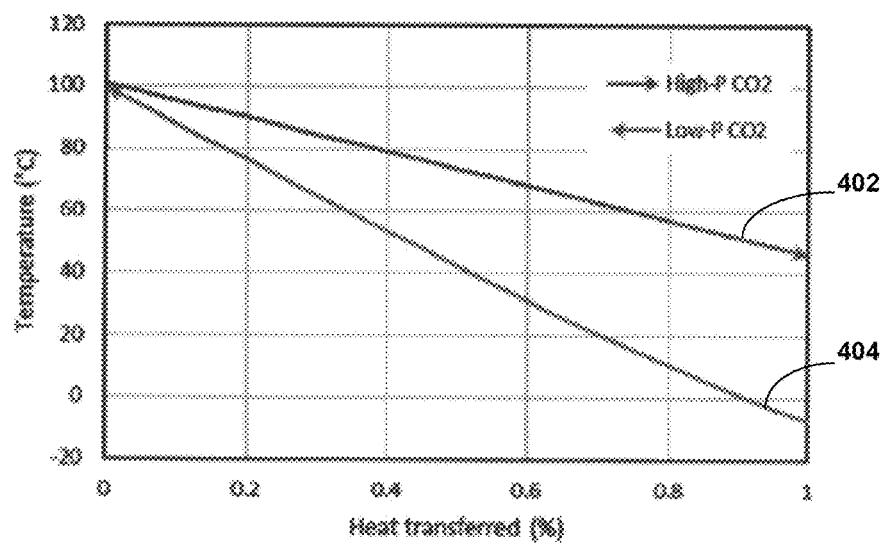
FIG. 3 is a temperature-heat transferred ("TQ") plot for the baseline PTES cycle of FIG. 2 in the PTES system of FIG. 1A-FIG. 1B.

FIG. 3 is a temperature-heat transferred ("TQ") plot for the baseline PTES cycle of FIG. 2 in the PTES system 100 of FIG. 1A-FIG. 1B. The TQ plot of FIG. 3 shows how the fluid temperature decreases/increases as heat is transferred when the working fluid pressure is high (curve 402) and when the working fluid pressure is low (curve 404). The slope of the TQ curves can be shown to be proportional to the inverse of the product of the fluid mass flow rate and specific heat capacity. The working fluid for the PTES system 100 in FIG. 1A-FIG. 1B is $CO_2$.

In the baseline version of the cycle, the working fluid flow rate through both sides of the recuperator RCX is the same. In the thermodynamically ideal case, the specific heat capacity of the working fluid would be the same on both sides of the recuperator RCX. In that situation, the two TQ curves 402, 404 would be parallel. As the heat exchanger conductance ("UA") increased, the two curves would approach each other, and at the limit of infinite UA, would overlay each other.

However, some working fluids, including $CO_2$, have specific heat capacity properties that vary with pressure as well as temperature. Since the two sides of the heat exchanger are at different pressures, the TQ curves are no longer parallel, but exhibit a "pinch" behavior at one of the heat exchanger "ends". Even though the amount of heat lost by the hot stream is the same as the amount gained by the cold stream, the temperature of the hot stream exiting the heat exchanger is higher than the temperature of hot stream entering. This temperature differential represents a lost "thermodynamic potential value" and reduces system performance (a more rigorous analysis can be performed using thermodynamic exergy destruction calculation methods to arrive at the same conclusion). In this case, the excess temperature of the fluid leaving the high-pressure end of the recuperator requires external heat rejection to the environment to achieve a nearly fully liquid state at the expander outlet. This heat lost has a direct impact on cycle performance.

As mentioned above, the presently disclosed technique reduces the impact of specific heat capacity mismatch across the recuperator to avoid the lost exergy associated with the TQ slope mismatch and thereby improve cycle performance markedly. In order to match the TQ curve slopes, the mass flow rate of the high-heat capacity fluid is reduced such that the product ("$mc_p$") of the mass ("m") and the specific heat capacity ("$c_p$") is the same on both sides of the recuperator. In the supercritical carbon dioxide ("$sCO_2$") power cycle known as the re-compression Brayton cycle ("RCB cycle"), this is accomplished by intentionally bypassing part of the $CO_2$ flow around the high-pressure side of the low-temperature recuperator using a second "bypass" compressor. However, because the PTES cycle operates at considerably lower temperatures than does the RCB cycle, this option is not available as it would require compression from a two-phase flow inlet.

Instead, during the charging phase, the presently disclosed technique adds a flow path parallel to the high-pressure side of the recuperator. Approximately 40% of the high-pressure $CO_2$ flow bypasses the high-pressure side of the recuperator and transfers its heat to a third heat transfer medium (the "medium-temperature reservoir", or "MTR"). The remaining approximately 60% of the flow proceeds through the recuperator. Now, the product of the mass and the specific heat capacity of both sides of the recuperator is nearly identical, thus permitting a much closer approach temperature between the fluids. The two flows are then recombined prior to passing through the expander. The heat extracted from the first 40% of the high-pressure $CO_2$ is transferred to a thermal storage medium.

During the generation cycle, the process is reversed. Approximately 60% of the $CO_2$ flow is split from the pump discharge and its temperature increased by transferring heat from the MTR medium. The remainder of the $CO_2$ passes through the high-pressure side of the recuperator, transferring heat from the recuperator. The flows recombine prior to being further heated by the high-temperature reservoir material.

The reduced exergy destruction results in substantial improvement in system performance. With comparable high-temperature and low-temperature reservoirs and other pressure, temperature and heat exchanger area constraints, the new cycle results in eight points higher round-trip efficiency ("RTE"), increasing from approximately 52% to 60%. It also enables the elimination of the charging phase ACC.

Figure 4A:
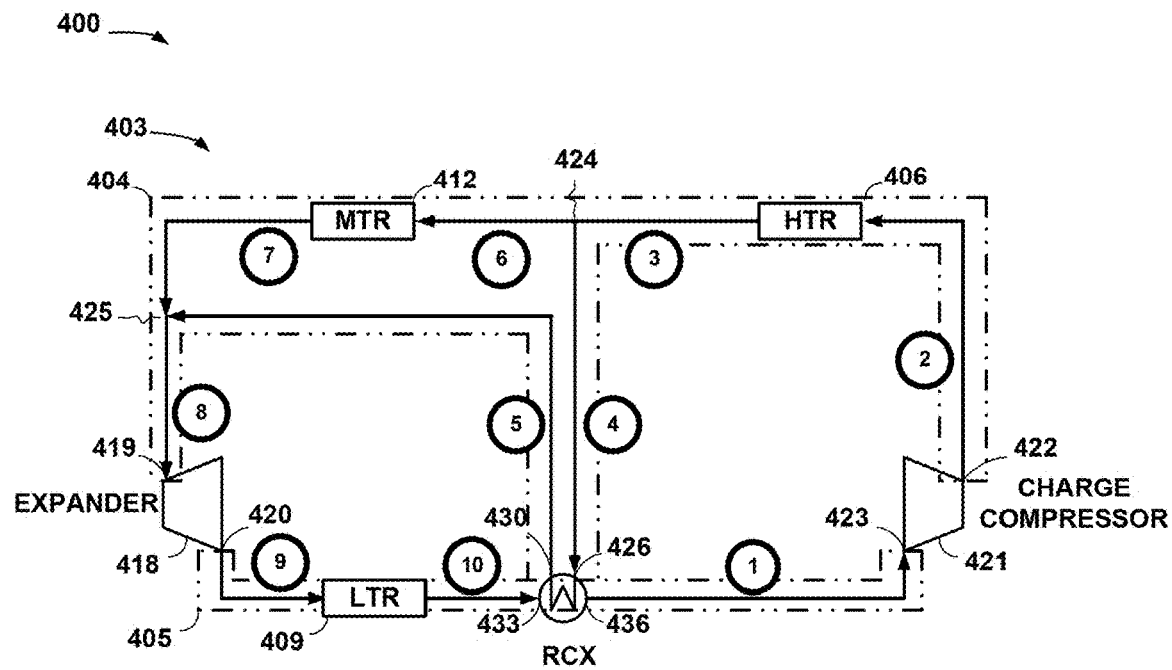
FIG. 4A is a process flow diagram for a PTES system during a charging phase of a PTES operational cycle in accordance with one or more embodiments.
Figure 4B:
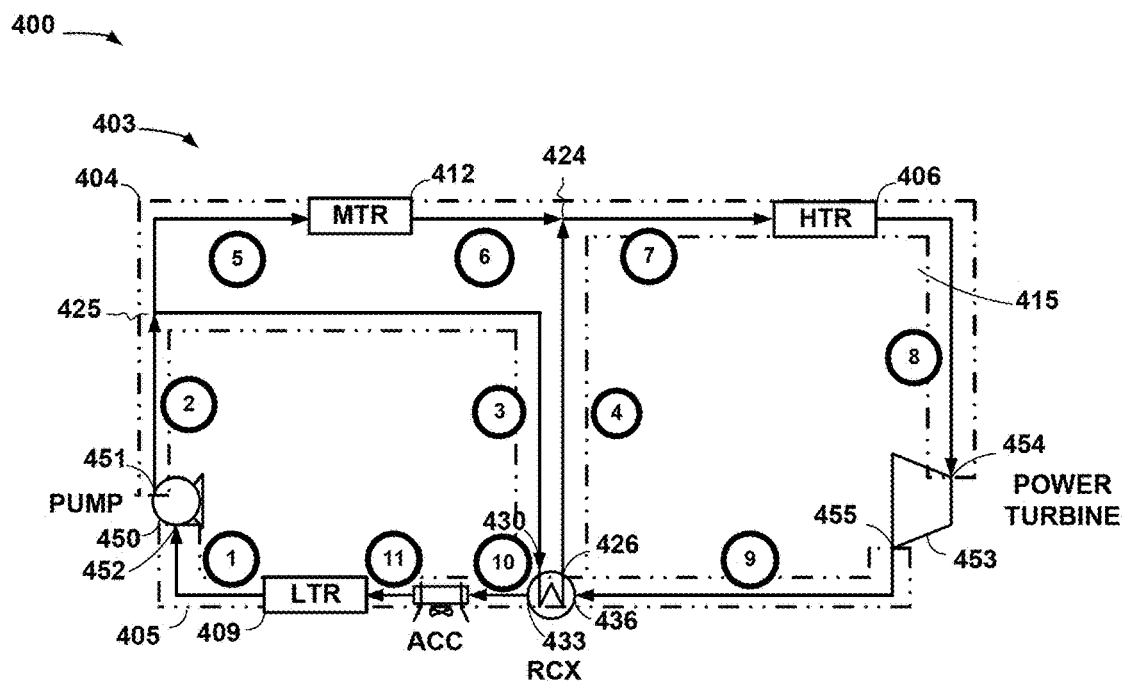
FIG. 4B is a process flow diagram for a PTES system during a generating phase of a PTES operational cycle in accordance with one or more embodiments.

Turning again to the drawings, FIG. 4A-FIG. 4B illustrate a charging phase and a generating phase, respectively, of an operational cycle for a PTES system 400 in accordance with one or more embodiments of the presently disclosed technique. Referring collectively to FIG. 4A and FIG. 4B, the PTES system 400 includes a configurable working fluid circuit 403, a high-temperature reservoir ("HTR") 406, a low-temperature reservoir ("LTR") 409, and a medium-temperature reservoir ("MTR") 412. The PTES system 400 may be characterized as a "three reservoir system" because there are three reservoirs—the HTR 406, the LTR 409, and the MTR 412.

The HTR 406 is so called because it operates at temperatures higher than those at which the LTR 409 and the MTR 412 operate. Similarly, the LTR 409 operates at temperatures lower than those at which the HTR 406 and the MTR 412 operate. The MTR 412 operates at temperatures intermediate those at which the HTR 406 and the LTR 409 operate. Thus, relative to the reservoirs HTR 406, LTR 409, and MTR 412, the terms "high", "medium", and "low" describe the relative temperatures at which the three reservoirs HTR 406, LTR 409, and MTR 412 operate.

Each of the thermal reservoirs HTR 406, LTR 409, and MTR 412 include a thermal storage medium not separately shown. In the illustrated embodiment, the thermal storage media are sand, liquid water and a water/ice mixture for the HTR 406, MTR 412, and LTR 409, respectively. However, the thermal storage medium may be any suitable thermal storage medium and alternative embodiments may use alternative thermal storage media. Each of the thermal reservoirs HTR 406, MTR 412, and LTR 409 may include heat exchangers, piping, pumps, valves and other controls not separately shown to transfer heat between the thermal storage media and the working fluid during operation of the PTES system 400.

Figure 6A:
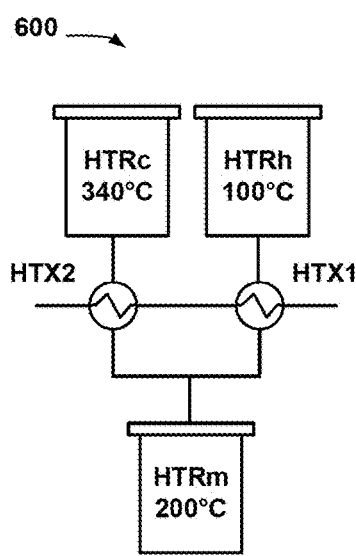
FIG. 6A-FIG. 6F illustrate several implementations of the thermal reservoirs of FIG. 4A-FIG. 4B as may be found in various embodiments.

For example, in the illustrated embodiment of FIG. 4A-FIG. 4B, the HTR 406 may be what is known as a three-tank system such as the three-tank system 600 shown in FIG. 6A. In a 3-tank system, during the charging process, the working fluid enters a first heat exchanger HTX1, where it transfers heat to a thermal reservoir medium. It then enters a second heat exchanger HTX2, where it transfers additional heat to a second thermal reservoir material. The thermal reservoir medium is transported from a first tank HTRc to the second heat exchanger HTX2, where it receives heat from the working fluid. Additional thermal reservoir material is stored in a second tank HTRm at an intermediate temperature is mixed with the thermal reservoir material. The mixed thermal reservoir material is then transported to the first heat exchanger HTX1, where it receives heat from the working fluid and is then stored in a third tank HTRh.

During the generating process, the directions of flow are reversed. Working fluid first enters a second heat exchanger HTX2, where it receives heat from a thermal reservoir medium. The working fluid then enters a first heat exchanger HTX1, where it receives additional heat from the thermal reservoir medium. Thermal reservoir medium is transported from a third tank HTRh to the first heat exchanger HTX1, where it transfers heat to the working fluid. The cooled thermal reservoir medium is then split into a first portion and a second portion. The first portion of thermal reservoir material is stored in a second tank HTRm. The second portion of thermal reservoir material is transported to the second heat exchanger HTX2 where it transfers additional heat to the working fluid. The cooled second portion of thermal reservoir material is stored in a first tank HTRc.

Figure 6B:
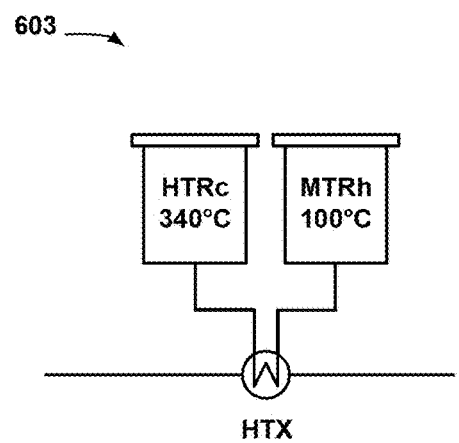

Similarly, in the illustrated embodiment of FIG. 4A-FIG. 4B, the MTR 412 and the LTR 409 may be implemented in a two-tank system such as the two-tank system 603 shown in FIG. 6B. In a two-tank thermal reservoir, during the charging process, the working fluid enters a heat exchanger and transfers heat to a thermal reservoir medium, which could be a liquid such as oil, water or molten salt, or a flowing granular medium, such as silica sand or sintered bauxite. The thermal reservoir medium is transported from a first tank HTRc to the heat exchanger where it receives heat from the working fluid, and then is stored in a second tank HTRh.

During the generating process, the direction of fluid flow is reversed. Working fluid enters a heat exchanger and received heat from a thermal reservoir medium. The thermal reservoir medium is transported from a second tank HTRh to a heat exchanger, where it transfers heat to the working fluid. The cooled thermal transport medium is then stored in the first tank HTRc.

Figure 6C:
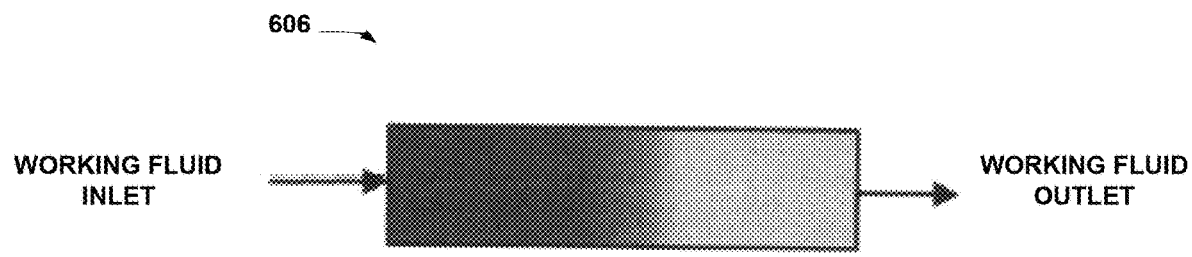

Other types of tank systems may be used in alternative embodiments. One such tank system is a solid thermocline reservoir 606, shown in FIG. 6C. In a thermocline thermal reservoir, during the charging process, working fluid enters a relatively lower temperature thermal storage medium. The thermal storage medium is generally a solid-phase material through which the working fluid may flow, either through pores in the thermal storage medium or through embedded tubes or pipes (not shown) within the thermal storage medium material. As the working fluid flows through the thermal storage medium, heat is transferred from the working fluid to the thermal storage medium, raising its temperature. The working fluid is cooled to a lower temperature and exits the thermal reservoir.

During the generating process, the direction of working fluid flow is reversed. Relatively lower temperature working fluid enters the heated thermal storage medium. Heat is transferred from the thermal storage medium, lowering its temperature, to the working fluid, raising its temperature. The heated working fluid then exits the thermal reservoir.

Figure 6D:
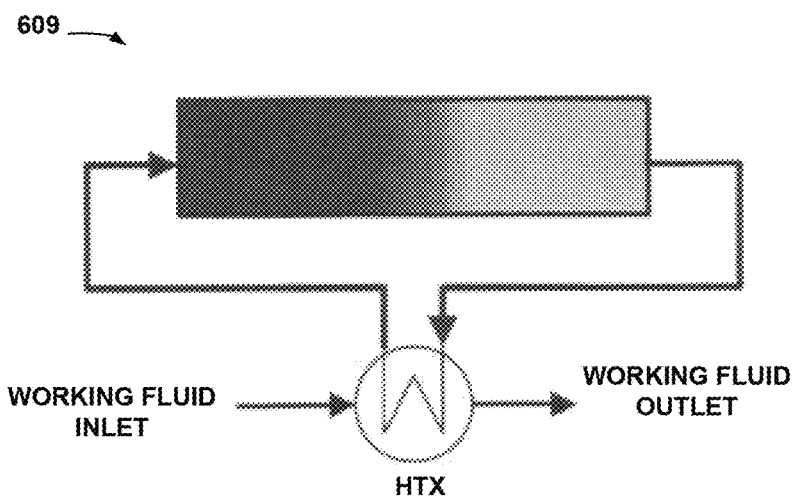

Another alternative tank system is a thermocline with ("HTF") 609, shown in FIG. 6D. Alternatively, during the charging process, the working fluid can transfer heat in a heat exchanger to a fluid thermal transfer medium, such as oil, water or air. The thermal transfer medium can then transfer heat to a thermal storage medium by flowing through the thermal storage medium. The cooled thermal transfer fluid is then transported to the heat exchanger, where it is reheated by the working fluid. During the generating process, the directions of working fluid and thermal transfer fluid are reversed.

Figure 6E:
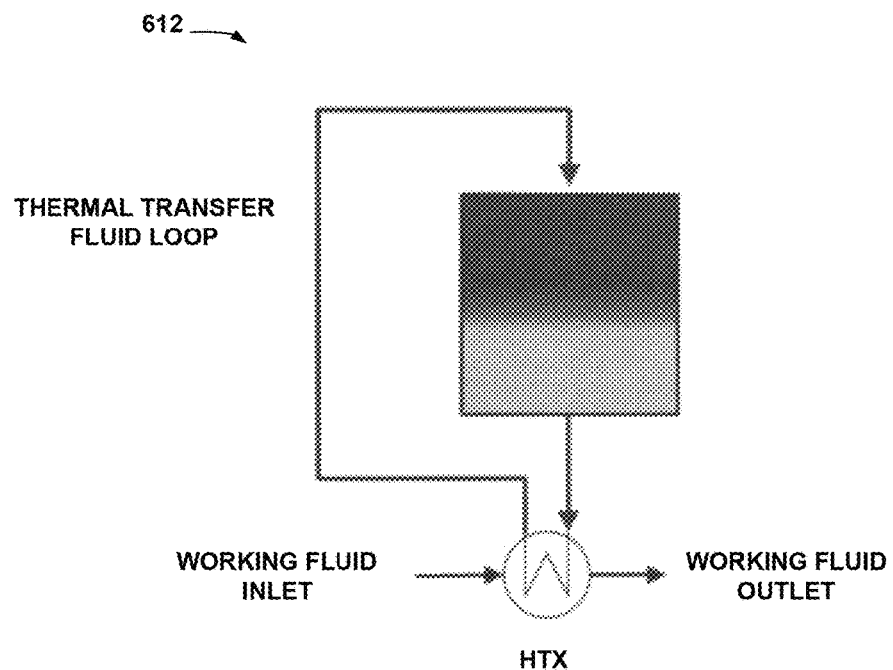

There are also one-tank thermocline storage systems such as the one-tank thermocline storage system 612 in FIG. 6E. In a one-tank thermocline reservoir, during the charging process working fluid enters a heat exchanger, where it transfers heat to a thermal transfer fluid. The heated thermal transfer fluid is transported to the top of a tank, where its lower fluid density results in thermal stratification with the higher-temperature fluid remaining in an upper layer. Colder thermal transfer fluid is withdrawn from the bottom of the tank and is transported to the heat exchanger.

During the generating process, the directions of flow are reversed. Relatively higher temperature thermal transfer fluid is transported from the top of the tank to the heat exchanger, where it heats the working fluid. The cooled thermal transfer fluid is transported to the bottom of the tank, where it remains thermally-stratified and separated from the higher temperature thermal transfer fluid.

Figure 6F:
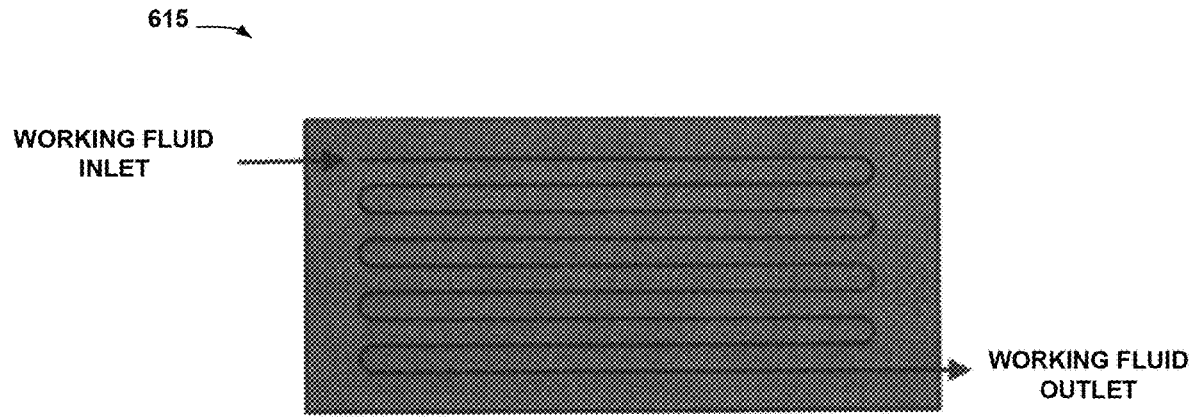

Embedded heat transfer surface systems such as the system 615 shown in FIG. 6F are also known. In an embedded heat transfer surface thermal reservoir, working fluid is transported through a series of tubes, pipes or other fluid channels that are immersed in a relatively uniform temperature thermal storage medium. In this example, the thermal storage medium can be water or another fluid that is near its freezing point, and the working fluid can be a liquid that is near its boiling point, or a liquid/vapor mixture at its boiling point temperature. During the heat transfer process, heat is transferred from the working fluid to the thermal storage medium, causing the working fluid to boil at constant temperature, while the thermal storage medium freezes from a liquid to a solid. The working fluid exits the thermal reservoir as a vapor at or slightly in excess of its boiling point During the generating process, the direction of working fluid flow is reversed. The working fluid enters at a pressure such that the boiling point of the working fluid is slightly above the freezing point of the thermal storage medium. Heat is transferred from the working fluid to the thermal storage medium, condensing the working fluid to a liquid state, and melting the thermal storage medium to a liquid state.

One or more of the tank systems shown in FIG. 6A-FIG. 6E may be used to implement the HTR 406, MTR 412, and LTR 409 in various alternative embodiments depending on implementation specific considerations. However, the list is neither exhaustive nor exclusive. Still other tank system designs may also be used.

Referring again to FIG. 4A-FIG. 4B, also common to the configurable working fluid circuit 403 in the charging phase and the generating phase is a bypass 415. The bypass 415 includes a MTR 412. As mentioned above and as will be discussed further below, the bypass 415 permits a portion of the working fluid to bypass the high-pressure side of the recuperator RCX.

FIG. 4A particularly illustrates the charging phase of the PTES operating cycle. In the charging phase, the configurable working fluid circuit 403 includes an expander 418 and a charge compressor 421. In the illustrated embodiment, the working fluid is $CO_2$. Alternative embodiments may use alternative working fluids as are known to the art. The following discussion of the charging phase is to be considered in conjunction with operating conditions set forth in Table 2. Those in the art having the benefit of this disclosure will appreciate that the values set forth in Table 2 are, in part, a function of the fact that the working fluid is $CO_2$. A different implementation of the working fluid may yield different values for the operating conditions in Table 2.

Also, in the following discussion, the state of the working fluid at any given point in the working fluid circuit 403 during the charging phase in FIG. 4A is shown as a numeral in a circle. Thus, the first state, or state 1, is shown as the numeral 1 in a circle in FIG. 4A. This can then be mapped back into Table 2 for a fuller characterization of the state.

TABLE 2

Charging Phase Operating Conditions

| State | Out | In | H (kJ/kg) | P (MPa) | T (° C.) | S (kJ/kg/K) | w (kg/sec) |
|---|---|---|---|---|---|---|---|
| 1 | RCXc | Compr | 568.91 | 3.20 | 114.94 | 2.287 | 49.53 |
| 2 | Compr | HTR | 791.45 | 30.00 | 362.60 | 2.326 | 49.53 |
| 3 | HTR | Split1 | 428.89 | 29.80 | 118.22 | 1.594 | 49.53 |
| 4 | Split1A | RCXh | 428.89 | 29.80 | 118.22 | 1.594 | 28.76 |
| 5 | RCXh | Mix1A | 196.14 | 29.70 | 1.16 | 0.890 | 28.76 |
| 6 | Split1B | MTR | 428.89 | 29.80 | 118.22 | 1.594 | 20.77 |
| 7 | MTR | Mix1B | 238.23 | 29.70 | 23.45 | 1.037 | 20.77 |
| 8 | Mix1 | Exp | 213.79 | 29.70 | 10.57 | 0.953 | 49.53 |
| 9 | Exp | LTR | 189.36 | 3.40 | −4.34 | 0.961 | 49.53 |
| 10 | LTR | RCXc | 433.75 | 3.30 | −1.05 | 1.863 | 49.53 |

The disclosure herein references the "high-pressure side" and the "low-pressure side" of the recuperator RCX. In the charging phase illustrated in FIG. 4A, the charge compressor 421 pressurizes the working fluid and provides the motive force for circulating the working fluid in the charging phase. The expander 418 expands, or depressurizes, the working fluid.

The portion of the working fluid circuit 403 through which the working fluid is pressurized by the charge compressor 421 circulates may be referred to as the "high-pressure side" of the working fluid circuit 403. Similarly, the portion of the working fluid circuit 403 through which the working fluid expanded by the expander 418 circulates may be referred to as the "low-pressure side" of the working fluid circuit 403. Thus, the high-pressure side 404 of the working fluid circuit 403 extends from the outlet 422 of the charge compressor 421 to the inlet 419 of the expander 418. The low-pressure side 405 extends from the outlet 420 of the expander 418 to the inlet 423 of the charge compressor 421.

The high-pressure side of the recuperator RCX is the side of the recuperator RCX that interfaces with the high-pressure side 404 of the working fluid circuit 403. In the charging phase shown in FIG. 4A, that would be the side of the recuperator RCX defined by the ports 426, 430 by which the pressurized working fluid circulates through the recuperator RCX. The low-pressure side of the recuperator RCX is the side that interfaces with the low-pressure side 405 of the working fluid circuit 403. The low-pressure side of the recuperator RCX is defined by the ports 433, 436 by which the expanded working fluid circulates through the recuperator RCX.

During the charging phase, beginning at the recuperator RCX, the working fluid exits the recuperator RCX and enters charge compressor 421 in a first state, or state 1, at a first temperature $T_1$ and a first pressure $P_1$. The charge compressor 421 compresses the working fluid and increases the temperature and pressure of the working fluid. The working fluid then leaves the charge compressor 421 in a second state at a second temperature $T_2$ and a second pressure $P_2$, the second temperature and the second pressure being greater than the first temperature $T_1$ and the first pressure $P_1$, respectively.

The working fluid then enters the high-temperature reservoir HTR 406 in the second state at the second temperature $T_2$ and the second pressure $P_2$. In the HTR 406, heat is transferred from the working fluid to the thermal storage medium in the HTR 406. The heat transfer process reduces the pressure and the temperature of the working fluid to a third state as the working fluid exits the HTR 406 at a third temperature $T_3$ and a third pressure $P_3$.

The working fluid then reaches a point 424 in the working fluid circuit 403 and splits. A first portion of the working fluid enters the bypass 415 and a second portion enters the line 427. The second portion enters the line 427 in a fourth state at a fourth temperature $T_4$ and a fourth pressure $P_4$. Reference to Table 2 shows that the fourth state is at the third temperature and the third pressure—i.e., $T_4=T_3$ and $P_4=P_3$—but differs from the third state prior to the split. The fourth state differs by having a lower mass flow rate than does the third state although the second portion is at the same temperature and pressure as the working fluid in the third state. The second portion then enters the high-pressure side of the recuperator RCX through the port 426 in the fourth state at the fourth temperature $T_4$ and the fourth pressure $P_4$.

In the recuperator RCX, heat is exchanged between the second portion and the circulating working fluid on the low-pressure side of the recuperator. This heat exchange cools the second portion to a fifth state in which, as shown in Table 2, the second portion is at a significantly lower fifth temperature $T_5$ and a slightly lower fifth pressure $P_5$. The second portion then exits the recuperator RCX on the high-pressure side of the recuperator RCX through the port 430 in a sixth state at a fifth temperature $T_5$ and a fifth pressure $P_5$.

While the second portion is circulating through recuperator RCX, the first portion enters the bypass 415 in a sixth state. Reference to Table 2 shows that the sixth state differs from the third state prior to the split. The sixth state differs by having a lower mass flow rate than does the third state although the second portion is at the same temperature and pressure as the working fluid in the fourth state. The first portion then enters the MTR 412 in the sixth state at a sixth temperature $T_6$ and a sixth pressure $P_6$.

In the MTR 412, heat is transferred between the medium-temperature thermal reservoir MTR 412 and the first portion of the working fluid. Recall that the MTR 412 operates at temperatures greater than the LTR 409 and less than the high-temperature thermal reservoir HTR 406. The first portion then exits the medium-temperature heat reservoir MTR 412 in a seventh state at a seventh temperature $T_7$ and at a seventh pressure $P_7$.

After the first portion exits the MTR 412 in the seventh state and the second portion exits the recuperator RCX in the fifth state, the first and second portions combine at a point 425. After combining, the working fluid is in an eighth state at an eighth pressure $P_8$ and an eighth temperature $T_8$ as set forth in Table 2. The combination of the first portion and the second portion, or the "combined portion", then enters the expander 418 in the eighth state at the eighth pressure $P_8$ and the eighth temperature $T_8$, whereupon it is expanded and cooled. The combined portion of the working fluid exits the expander 418 in a ninth state at a ninth temperature $T_9$ and a ninth pressure $P_9$.

The working fluid then enters the LTR 409 in the ninth state at the ninth temperature $T_9$ and the ninth pressure $P_9$. In the LTR 409, heat is transferred from the LTR 409 to the working fluid. Note that the LTR 409 operates at temperatures lower than the medium temperature thermal reservoir MTR 412 and the high-temperature thermal reservoir HTR 406 as indicated in Table 2. The working fluid leaves the LTR 409 in a tenth state at a tenth temperature $T_{10}$ and a tenth pressure $P_{10}$.

Upon exit from the LTR 409, the working fluid enters the recuperator RCX in the tenth state at the tenth temperature $T_{10}$ and the tenth pressure $P_{10}$ and exits in the first state at the first temperature $T_1$ and the first pressure $P_1$. In the recuperator RCX, heat is transferred from the working fluid on the high-pressure side to the working fluid on the low-pressure side of the recuperator RCX. Table 2 confirms (1) the temperature drop in the working fluid on the high-pressure side 404 as it transitions from the fourth state to the fifth state and (2) the temperature rise in the working fluid on the low-pressure side 405 as it transitions from the tenth state to the first state. The working fluid then begins again the circulation through the working fluid circuit 403 discussed immediately above.

Turning now to FIG. 4B, the configuration of the working fluid circuit 403 in the generating phase of the PTES operational cycle is shown. The operating conditions at various points in the working fluid circuit 403 are listed in Table 3. As discussed above, the flow direction of the working fluid through the working fluid circuit 403 is reversed relative to that in the charging phase of the operational cycle. Note that the expander 419 and the charge compressor 421 in the charging phase configuration of FIG. 4A have been replaced by a pump 450 and a power turbine 453, respectively. As can be seen from comparing states 1 and 2 in Table 3 and states 9 and 10 in Table 3, the pump 450 pressurizes the working fluid and the power turbine 453 depressurizes the working fluid.

The high-pressure side 404 of the working fluid circuit 403 therefore extends, in this phase of the operational cycle, from the outlet 451 of the pump 450 to the inlet 454 of the power turbine 453. The low-pressure side 405 extends from the outlet 455 of the power turbine 453 to the inlet 452 of the pump 450. Note that the high-pressure side 404 includes the bypass 415, the line 427, the point 425, and the point 424. The high-pressure side 404 of the recuperator RCX is once again defined by the ports 426, 430 and the low-pressure side 405 of the recuperator RCX is once again defined by the ports 433, 436.

TABLE 3

Generating Phase Operating Conditions

| State | Out | In | H (kJ/kg) | P (MPa) | T (° C.) | S (kJ/kg/K) | w (kg/sec) |
|---|---|---|---|---|---|---|---|
| 1 | LTX | Pump | 204.69 | 3.87 | 2.00 | 1.016 | 79.71 |
| 2 | Pump | Split1 | 234.60 | 29.23 | 21.52 | 1.027 | 79.71 |
| 3 | Split1A | RHXc | 234.60 | 29.23 | 21.52 | 1.027 | 27.12 |
| 4 | RHXc | Mix1A | 413.93 | 29.13 | 109.95 | 1.558 | 27.12 |
| 5 | Split1B | MTR | 234.60 | 29.23 | 21.52 | 1.027 | 52.58 |
| 6 | MTR | Mix1B | 358.20 | 29.13 | 83.04 | 1.408 | 52.58 |
| 7 | Mix1 | HTR | 377.17 | 29.13 | 92.12 | 1.460 | 79.71 |
| 8 | HTR | PT | 747.69 | 28.93 | 327.50 | 2.262 | 79.71 |
| 9 | PT | RHXh | 589.50 | 4.07 | 139.10 | 2.296 | 79.71 |

TABLE 3-continued

Generating Phase Operating Conditions

| State | Out | In | H (kJ/kg) | P (MPa) | T (° C.) | S (kJ/kg/K) | w (kg/sec) |
|---|---|---|---|---|---|---|---|
| 10 | RHXh | ACC | 528.48 | 3.97 | 81.58 | 2.141 | 79.71 |
| 11 | ACC | LTX | 454.38 | 3.92 | 20.00 | 1.912 | 79.71 |

Beginning with the LTR 409, the working fluid exits the LTR 409 and enters the pump 450 in a first state at a first temperature $T_1$ and a first pressure $P_1$. The pump 450 provides the motive force for circulation in the generating phase. The working fluid exits the pump 450 in a second state at a second temperature $T_2$ and a second pressure $P_2$.

The working fluid, upon exiting the pump 450 in the second state, splits at the point 425 into a first portion and a second portion. Note that, in the charging phase illustrated in FIG. 4A, the two portions of the working fluid split at the point 424 and combine at the point 425. However, since the flow direction of the working fluid is reversed in the generating phase relative to the charging phase, the two portions split at the point 425 and combine at the point 424.

The second portion enters the line 428 after the split at the point 425. The second portion enters the line 428 in a third state at a third temperature $T_3$ and a third pressure $P_3$. Reference to Table 2 shows that the third state is at the second temperature and the second pressure—that is, the third temperature $T_3$ and the third pressure are the same as the second temperature and the second pressure. The third state nevertheless differs from the second state by having a significantly lower mass flow rate than does the second state. The second portion then circulates through the recuperator RCX from the high-pressure side 404 thereof, entering through the port 430 and exiting through the port 426. The second portion enters the recuperator RCX in the third state at the third temperature and the third pressure and exits in a fourth state at a fourth temperature and a fourth pressure.

After splitting at the point 425, the first portion of the working fluid enters the bypass 415 in a fifth state at a fifth temperature $T_5$ and fifth pressure $P_5$. The first portion enters the MTR 412 in the fifth state at the fifth temperature $T_5$ and the fifth pressure $P_5$. In the MTR 412, heat is transferred MTR 412 from the medium temperature thermal reservoir MTR 412 to the first portion. The first portion then exits the MTR 412 in a sixth state at a sixth temperature $T_6$ and at a sixth pressure $P_6$.

The first portion in the sixth state and the second portion in the fourth state, upon leaving the MTR 412 and the recuperator RCX, respectively, combine at the point 424. Note again that, in the charging phase illustrated in FIG. 4A, the two portions of the working fluid split at the point 424 and combine at the point 425. However, since the flow direction of the working fluid is reversed in the generating phase relative to the charging phase, the two portions split at the point 425 and combine at the point 424. The combined portion of the working fluid after the point 424 is in a seventh state at a seventh temperature $T_7$ and a seventh pressure $P_7$.

The combined portion then enters the high-temperature reservoir HTR 406 in the seventh state at the seventh temperature $T_7$ and the seventh pressure $P_7$. In the high-temperature reservoir HTR 406, heat is transferred from the high-temperature thermal reservoir HTR 406 to the combined portion. The combined portion then exits the high-temperature reservoir HTR 406 in an eighth state at an eighth temperature $T_8$ and an eighth pressure $P_8$.

The combined portion of the working fluid then enters the power turbine 453 in the ninth state at the eighth temperature $T_8$ and the eighth pressure $P_8$. More particularly, the combined portion enters the power turbine 453 from the high-pressure side 404 of the working fluid circuit 403 through the inlet 454. The power turbine 453 expands the working fluid, which cools and reduces the pressure of the combined portion. The combined portion then exits the power turbine 453 in a ninth state at a ninth temperature $T_9$ and a ninth pressure $P_9$. More particularly, the combined portion exits the power turbine to the low-pressure side 405 of the working fluid circuit 403 through the outlet 455.

The combined portion then circulates through the low-pressure side of the recuperator RCX via the ports 433, 436. In the recuperator RCX, heat is exchanged between the second portion of the working fluid entering the recuperator RCX from the high-pressure side thereof as described above and the combined portion entering the recuperator RCX from the low-pressure side thereof. The combined portion then exits the recuperator RCX in a tenth state at a tenth temperature $T_{10}$ and a tenth pressure $P_{10}$. The combined portion then enters the air-cooled cooler ACC in the tenth state at the tenth temperature $T_{10}$ and the tenth pressure $P_{10}$. The air-cooled cooler ACC then cools the combined portion to an eleventh state at an eleventh temperature $T_{11}$ and an eleventh pressure $P_{11}$.

The combined portion then enters the LTR 409 in the eleventh state at the eleventh temperature $T_{11}$ and the eleventh pressure $P_{11}$. In the LTR 409, heat is transferred from the LTR 409 from the combined portion to the LTR 409 of the LTR 409. The combined portion then leaves the LTR 409 in the first state at the first temperature and the first pressure to recirculate through the working fluid circuit 403 as just discussed.

Figure 5:
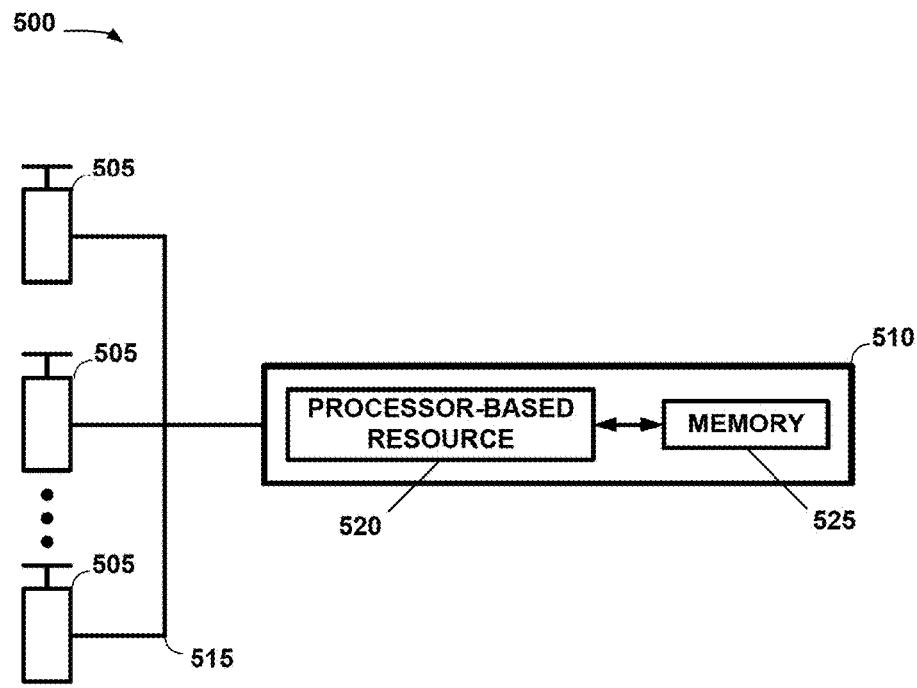
FIG. 5 illustrates one particular example of a control system by which the working fluid circuit of FIG. 4A-FIG. 4B may be configured for the charging phase, shown in FIG. 4A, and the generating phase, shown in FIG. 4B.

As was mentioned above, the configuration of the working fluid circuit 403 between the charging phase shown in FIG. 4 and the charging phase shown in FIG. 4B may be controlled by fluid flow valves. Although such control systems are readily known to those in the art, one such control system 500 is shown in FIG. 5 for the sake of completeness. The control system 500 may include a plurality of fluid flow valves 505 and a controller 510 sending control signals over electrical lines 515.

The controller 510 includes a processor-based resource 520 that may be, for example and without limitation, a microcontroller, a microprocessor, an Application Specific Integrated Circuit ("ASIC"), an Electrically Erasable Programmable Read-Only Memory ("EEPROM"), or the like. Depending on the implementation of the processor-based resource, the controller 510 may also include a memory 525 encoded with instructions (not shown) executable by the processor-based resource 520 to implement the functionality of the controller 510. Again, depending on the implementation of the processor-based resource 520, the memory 525 may be a part of the processor-based resource 520 or a stand-alone device. For example, the instructions may be firmware stored in the memory portion of a microprocessor or they may be a routine stored in a stand-alone read-only or random-access memory chip. Similarly, in some implementations of the processor-based resource 520—e.g., an ASIC—the memory 535 may be omitted altogether.

Referring now collectively to FIG. 4A-FIG. 4B and FIG. 5, a controller such as the controller 510 may be used to configure the working fluid circuit 403 between the charging phase as shown in FIG. 4A and generating phase shown in FIG. 4B. The controller 510 may send control signals to the fluid flow valves 505 to control the working fluid flow. Thus, to configure the working fluid circuit 403 for the charging phase, the controller 510 controls the fluid flow valves 505 to direct the working fluid to the charge compressor 421 and the expander 418 while diverting the working fluid away from the power turbine 453 and the pump 450. Conversely, to configure the working fluid circuit 403 for the generating phase, the controller 510 controls the fluid flow valves 505 to direct working fluid to the power turbine 453 and the pump 450 while diverting the working fluid away from the charge compressor 421 and the expander 418.

Referring now, collectively, to FIG. 4A-FIG. 4B, the high-pressure side 404 of the working fluid circuit 403 includes the bypass 415 in both the charging phase and the operational phase. Thus, the bypass 415, including the heat exchanger (not shown) of the MTR 412, is on the high-pressure side of the recuperator RCX in both phases. The working fluid splits before entering the recuperator RCX at the point 424 in the charging phase and at the point 425 in the generating phase. The first portion bypasses the high-pressure-side of the recuperator RCX through the bypass 415 while the second side enters the recuperator RCX. The first and second portions then combine after the second portion passes through the recuperator RCX at the point 425 in the charging phase and at the point 424 in the generating phase.

Splits and combinations in the high-pressure side 404 of the working fluid circuit 402 occur at the points 424, 425 in the illustrated embodiment. However, whether the points 424, 425 are split points or combination points will depend on whether the operating cycle is in the charging phase or in the generating phase. In the charging phase, the point 424 is a split point and in the generating phase it is the combination point. Conversely, the point 425 is the combination point in the charging phase and the splitting point in the generating phase. Note that alternative embodiments may have split and combination points in addition to or in lieu of those disclosed herein. This is particularly true in the pursuit of design goals unrelated to implementing the technique disclosed herein.

The objective is to balance the product of the mass and the specific heat capacity on the low-pressure side 405 of the recuperator RCX with the product of the mass and the specific heat capacity on the high-pressure side 404 of the recuperator RCX. The term "balanced" means that the product of the mass and specific heat capacity on both sides of the recuperator RCX are equal. However, this may be difficult to achieve with precision in practice for a variety of reasons. Thus, the two products are "balanced" when they are "about", "roughly", or "approximately" equal in the sense that they are both within some margin for error in which the operation of the overall system achieves some desired level of efficiency. The desired level of efficiency may be expressed as a range of values to accommodate these types of concerns.

Similarly, the terms "about", "approximately", etc. relative to any quantity in this disclosure indicates that some deviation from the stated quantity may be tolerated so long as the actual quantity is within some margin for error in which the operation of the overall system achieves some desired level of efficiency. For example, in the illustrated embodiment, the first portion may be 40% and the second portion may be 60% of the total, combined working fluid as will be discussed in more detail below. In any given embodiment employing $CO_2$ for the working fluid, a precise split in these proportions may be difficult to achieve. Hence, some deviation may be tolerated so long as the proportions are "about" or "approximately" 40% and 60%. The same is true of any other quantity discussed or disclosed herein.

Those in the art having the benefit of this disclosure will appreciate that both the mass flow rate and the specific heat capacity in any given embodiment will be implementation-specific depending on factors such as, for example, the choice for implementing the working fluid. Other factors, such as the operational ranges of pumps, expanders, compressors, etc. may impact the operating conditions for various portions of the working fluid circuit. Thus, the various quantities for the parameters in Table 2 and Table 3 may differ in alternative embodiments employing different substances for the working fluid or that implement certain equipment differently.

As noted above, the working fluid in the illustrated embodiment is $CO_2$. When the working fluid is split as previously described, the first portion is 40% of the total working fluid and the second portion is 60% of the total working fluid. This is true in both the charging phase and in the generating phase. In alternative embodiments using different working fluids or different mass flow rates this proportion may be changed to maintain the balance of the mass flow rate and the specific heat on both the high-pressure side and the low-pressure side of the recuperator.

Accordingly, in a first embodiment, a method for operating a pumped thermal energy storage ("PTES") system, the method comprises: circulating a working fluid through a working fluid circuit, the working fluid having a mass flow rate and a specific heat capacity; and balancing a product of the mass and the specific heat capacity of the working fluid on a high-pressure side of a recuperator and a low side of the recuperator as the working fluid circulates through the working fluid circuit.

In a second embodiment, the first embodiment balances the product of the mass and the specific heat capacity of the working fluid on the high-pressure side of the recuperator and the low side of the recuperator as the working fluid circulates through the working fluid circuit by: splitting the working fluid into a first portion and a second portion on the high-pressure side of the recuperator; bypassing the first portion around the high-pressure side of the recuperator; cooling the first portion during the bypass; circulating the second portion through a recuperator; and combining the cooled first portion with the second portion after the second portion exits the recuperator.

In a third embodiment, the second embodiment cools the first portion during the bypass by circulating the working fluid through the bypass; and transferring heat between the working fluid and a medium temperature thermal reservoir. The heat transfer includes, in a charging phase, transferring heat from a low-temperature thermal reservoir to the working fluid and transferring heat from the working fluid to a medium-temperature thermal reservoir and high-temperature thermal reservoir and, in a generating phase, transferring heat from a high-temperature thermal reservoir and a medium temperature thermal reservoir (hot) to the working fluid and transferring heat from the working fluid to a low-temperature thermal reservoir.

In a fourth embodiment, the second embodiment may be implemented such that the first portion of the working fluid comprises 40% of the working fluid portion and the second portion comprises 60% of the working fluid portion.

In a fifth embodiment, the first embodiment may be implemented such that circulating the working fluid through the working fluid circuit includes circulating carbon dioxide ($CO_2$), the first portion of the working fluid comprises 40% of the working fluid portion, and the second portion comprises 60% of the working fluid portion.

In a sixth embodiment, the second embodiment may be implemented such that circulating the working fluid through the working fluid circuit includes circulating carbon dioxide ($CO_2$).

In a seventh embodiment, the first embodiment may be implemented such that balancing a product of the mass and the specific heat capacity of the working fluid on the high-pressure side of a recuperator and the low side of the recuperator includes a charging phase and a generating phase. The charging phase includes circulating 60% of a working fluid comprised of carbon dioxide ($CO_2$) through the high-pressure side of a recuperator and circulating 100% of a working fluid comprised of $CO_2$ through the low-pressure side of the recuperator. The generating phase includes circulating 60% of a working fluid comprised of $CO_2$ through the high-pressure side of a recuperator and circulating 100% of a working fluid comprised of $CO_2$ through the low-pressure side of the recuperator.

In an eighth embodiment, the first embodiment may be implemented such that balancing the product of the mass and the specific heat capacity of the working fluid on the high-pressure side of the recuperator and the low side of the recuperator as the working fluid circulates through the working fluid circuit includes reducing the mass flow rate on the high-pressure side of the recuperator.

In a ninth embodiment, the first embodiment further comprises exchanging heat between the second portion of the working fluid on the high-pressure side of the recuperator and a combined portion of the working fluid on the low-pressure side of the recuperator.

In a tenth embodiment, a pumped thermal energy storage ("PTES") system, comprises a medium temperature thermal reservoir and a working fluid circuit. The working fluid circuit includes a recuperator having a high-pressure side and a low-pressure side, the product of the mass and the specific heat capacity of a working fluid is balanced on the high-pressure side and the low-pressure side when the working fluid circulates through the working fluid circuit.

In an eleventh embodiment, the tenth embodiment may be implemented such that the working fluid is carbon dioxide ($CO_2$).

In a twelfth embodiment, the tenth embodiment may be implemented such that the working fluid circuit includes a bypass by which a first portion of the working fluid bypasses the high-pressure side of the recuperator while a second portion of the working fluid circulates through the high-pressure side of the recuperator.

In a thirteenth embodiment, the eleventh embodiment may be implemented such that the bypass includes a heat transfer between the first portion and the medium temperature thermal reservoir. Furthermore, the working fluid circuit further includes: a split on the high-pressure side of the recuperator splitting the working fluid into the first portion and the second portion, the first portion being less than the second portion, the second portion circulating through the recuperator from the high-pressure side of the recuperator; and a combination point on the high-pressure side of the recuperator where the first portion combines with the second portion upon the second portion exiting the recuperator.

In a fourteenth embodiment, the eleventh embodiment may be implemented such that the first portion is 40% of the total working fluid and the second portion is 60% of the total working fluid.

In a fifteenth embodiment, the eleventh embodiment may be implemented such that the working fluid is carbon dioxide ($CO_2$), the first portion is 40% of the total working fluid, and the second portion is 60% of the total working fluid.

In a sixteenth embodiment, the tenth embodiment may be implemented such that, in operation, heat is exchanged between the second portion of the working fluid on the high side of the recuperator and a combined portion of the working fluid on the low-pressure side of the recuperator.

In a seventeenth embodiment, a method for operating a pumped thermal energy storage ("PTES") system includes circulating a working fluid through a working fluid circuit; and reducing a mass flow rate of the working fluid on a high-pressure side of a recuperator to balance a product of the mass and the specific heat of the working fluid on the high-pressure side and a low-pressure side of the recuperator while circulating the working fluid. The reducing may include bypassing the high-pressure side of the recuperator with a first portion of the working fluid and circulating a second portion of the working fluid through the high-pressure side of the recuperator.

In an eighteenth embodiment, the seventeenth embodiment may be implemented such that bypassing the high-pressure side of the recuperator includes: upon transferring heat between the working fluid and a high-temperature reservoir in a charging phase, bypassing the high-pressure side of a recuperator with a first portion of the working fluid and transferring heat from the first portion to a medium-temperature reservoir during the bypass while a second portion circulates through the recuperator, the first portion being less than the second portion; and upon exiting a pump in a generating phase, bypassing the high-pressure side of the recuperator with a third portion of the working fluid while transferring heat from the medium-temperature reservoir to the third portion during the bypass while circulating a fourth portion of the working fluid through the recuperator.

In a nineteenth embodiment, the seventeenth embodiment may include exchanging heat between the second portion of the working fluid on the high side of the recuperator and a combined portion of the working fluid on the low-pressure side of the recuperator.

In a twentieth embodiment, the seventeenth embodiment may be implemented such that reducing the mass flow rate of the working fluid on the high-pressure side of the recuperator to balance the product of the mass and the specific heat of the working fluid on the high-pressure side and the low-pressure side of the recuperator while circulating the working fluid further includes: splitting the working fluid into the first portion and the second portion on the high-pressure side of the recuperator, the first portion being less than the second portion; cooling the first portion during the bypass; and combining the cooled first portion with the second portion after the second portion exits the recuperator.

In a twenty-first embodiment, the twentieth embodiment may be implemented such that cooling the first portion during the bypass includes transferring heat between the working fluid and a medium temperature thermal reservoir. Transferring the heat may further include: in a charging phase, transferring heat from the working fluid to a medium temperature thermal reservoir and, in a generating phase, transferring heat from a medium temperature thermal reservoir to the working fluid.

In a twenty-second embodiment, the seventeenth embodiment may be implemented such that circulating the working fluid through the working fluid circuit includes circulating carbon dioxide ($CO_2$).

In a twenty-third embodiment, the seventeenth embodiment may be implemented such that the first portion of the working fluid comprises 40% of the working fluid portion and the second portion comprises 60% of the working fluid portion.

In a twenty-fourth embodiment, the seventeenth embodiment may be implemented such that circulating the working fluid through the working fluid circuit includes circulating carbon dioxide ($CO_2$) and the first portion of the working fluid comprises 40% of the working fluid portion and the second portion comprises 60% of the working fluid portion.

In a twenty-fifth embodiment, a pumped thermal energy storage ("PTES") system, comprises a low-temperature reservoir, a high-temperature reservoir, a medium-temperature reservoir, and a working fluid circuit configurable for a charging phase and a generating phase of a PTES operating cycle and through which, in use, a working fluid circulates. The working fluid circuit may include a recuperator; when in the charging phase: an expander positioned between the recuperator and the low-temperature reservoir; and a charge compressor positioned between recuperator and the high-temperature heat reservoir; and when in the generating phase: a pump positioned between recuperator and the low-temperature heat reservoir; and a power turbine positioned between recuperator and the high-temperature heat reservoir; and a bypass, by which, in both the charging phase and the generating phase, a first portion of the working fluid bypasses the high-pressure side of the recuperator and flows through the medium-temperature thermal reservoir, the medium-temperature thermal reservoir transferring heat between the working fluid and the medium-temperature thermal reservoir, while a second portion of the working fluid circulates through the recuperator.

In a twenty-sixth embodiment, the twenty-fifth embodiment may be implemented such that the working fluid is carbon dioxide ($CO_2$).

In a twenty-seventh embodiment, the twenty-fifth embodiment may be implemented such that the first portion is 40% of the total working fluid and the second portion is 60% of the total working fluid.

In a twenty-eighth embodiment, the twenty-fifth embodiment may be implemented such that the working fluid is carbon dioxide ($CO_2$), the first portion is 40% of the total working fluid, and the second portion is 60% of the total working fluid.

In a twenty-ninth embodiment, a method for operating a pumped thermal energy storage ("PTES") system, the method comprises: circulating a high-heat capacity working fluid through a working fluid circuit including a recuperator; and reducing a mass flow rate of the working fluid on the high-pressure side of the recuperator such that the product of mass and the specific heat capacity is the same on both sides of a recuperator. Reducing the mass flow rate may include, in a charging phase: bypassing a recuperator with a first portion of the working fluid and transferring heat from the first portion to a medium-temperature reservoir during the bypass while circulating a second portion of the working fluid through the recuperator, the first portion being a lesser portion of the working fluid than the second portion; circulating a second portion through the recuperator while the first portion bypasses the recuperator and transferring heat from the second portion while circulating through the recuperator; and circulating both the first portion and the second portion together through an expander after the first portion bypasses the recuperator and the second portion circulates through the recuperator. Reducing the mass flow rate may include, in a generating phase: bypassing the recuperator with a third portion of the working fluid and transferring heat from the third portion to a medium-temperature reservoir during the bypass while circulating a fourth portion of the working fluid through the recuperator, the third portion being a greater portion than the fourth portion; circulating a fourth portion through the recuperator while the third portion bypasses the recuperator and transferring heat to the fourth portion while circulating through the recuperator; and circulating both the third portion and the fourth portion together through a high-temperature reservoir after the third portion bypasses the recuperator and the fourth portion circulates through the recuperator.

In a thirtieth embodiment, the twenty-ninth embodiment may be implemented such that the working fluid is carbon dioxide ($CO_2$).

In a thirty-first embodiment, the thirtieth embodiment may be implemented such that the first portion represents approximately 40%, the second portion represents approximately 60% of the mass flow rate of the working fluid in the charging phase, and the third portion represents approximately 40% and the fourth portion represents approximately 60% of the mass flow rate of the working fluid in the generating phase.

In a thirty-second embodiment, the twenty-ninth embodiment may be implemented such that the first portion represents approximately 40% and the second portion represents approximately 60% of the mass flow rate of the working fluid in the charging phase and the third portion represents approximately 40% and the fourth portion represents approximately 60% of the mass flow rate of the working fluid in the generating phase.

Those skilled in the art having the benefit of this disclosure may appreciate still other embodiments of the technique disclosed herein.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for operating a pumped thermal energy storage ("PTES") system, the method comprising:
    circulating a working fluid through a working fluid circuit, the working fluid having a mass flow rate and a specific heat capacity; and
    balancing a product of the mass and the specific heat capacity of the working fluid on a high-pressure side of a recuperator and a low-pressure side of the recuperator as the working fluid circulates through the working fluid circuit, the balancing including:
        splitting the working fluid into a first portion and a second portion on the high-pressure side of the recuperator;
        bypassing the first portion around the high-pressure side of the recuperator;
        cooling the first portion during the bypass;
        circulating the second portion through the recuperator; and
        combining the cooled first portion with the second portion after the second portion exits the recuperator.

2. The method of claim 1, wherein cooling the first portion during the bypass includes:
    circulating the working fluid through the bypass; and
    transferring heat between the working fluid and a medium temperature thermal reservoir, including:
        in a charging phase, transferring heat from the working fluid to the medium-temperature thermal reservoir; and
        in a generating phase, transferring heat from the medium-temperature thermal reservoir to the working fluid.

3. The method of claim 1, wherein the first portion of the working fluid comprises approximately 40% of the working fluid portion and the second portion comprises approximately 60% of the working fluid portion.

4. The method of claim 1, wherein:
    circulating the working fluid through the working fluid circuit includes circulating carbon dioxide ($CO_2$);
    the first portion of the working fluid comprises approximately 40% of the working fluid portion; and
    the second portion comprises approximately 60% of the working fluid portion.

5. The method of claim 1, wherein circulating the working fluid through the working fluid circuit includes circulating carbon dioxide ($CO_2$).

6. The method of claim 1, wherein balancing a product of the mass and the specific heat capacity of the working fluid on the high-pressure side of the recuperator and the low-pressure side of the recuperator includes:
    in a charging phase:
        circulating approximately 60% of the working fluid comprised of carbon dioxide ($CO_2$) through the high-pressure side of the recuperator; and
        circulating 100% of the working fluid comprised of $CO_2$ through the low-pressure side of the recuperator; and
    in a generating phase:
        circulating approximately 60% of the working fluid comprised of $CO_2$ through the high-pressure side of the recuperator; and
        circulating 100% of the working fluid comprised of $CO_2$ through the low-pressure side of the recuperator.

7. The method of claim 1, wherein balancing the product of the mass and the specific heat capacity of the working fluid on the high-pressure side of the recuperator and the low-pressure side of the recuperator as the working fluid circulates through the working fluid circuit includes reducing the mass flow rate on the high-pressure side of the recuperator.

8. The method of claim 1, further comprising exchanging heat between the second portion of the working fluid on the high-pressure side of the recuperator and a combined portion of the working fluid on the low-pressure side of the recuperator.

9. A pumped thermal energy storage ("PTES") system, comprising:
    a medium temperature thermal reservoir; and
    a working fluid circuit, including:
        a recuperator having a high-pressure side and a low-pressure side, the product of the mass and the specific heat capacity of a working fluid is balanced on the high-pressure side and the low-pressure side when the working fluid circulates through the working fluid circuit;
        a split point on the high-pressure side of the recuperator at which the working fluid is split into a first portion and a second portion; and a bypass by which the first portion of the working fluid bypasses the high-pressure side of the recuperator while the second portion of the working fluid circulates through the high-pressure side of the recuperator.

10. The system of claim 9, wherein the working fluid is carbon dioxide ($CO_2$).

11. The system of claim 9, wherein:
the bypass includes a heat transfer between the first portion and the medium temperature thermal reservoir;
the first portion is less than the second portion; and
the working fluid circuit further comprises:
a combination point on the high-pressure side of the recuperator where the first portion combines with the second portion upon the second portion exiting the recuperator.

12. The system of claim 9, wherein the first portion is approximately 40% of the total working fluid and the second portion is approximately 60% of the total working fluid.

13. The system of claim 9, wherein:
the working fluid is carbon dioxide ($CO_2$);
the first portion is approximately 40% of the total working fluid; and
the second portion is approximately 60% of the total working fluid.

14. The system of claim 9, further wherein, in operation, heat is exchanged between the second portion of the working fluid on the high-pressure side of the recuperator and a combined portion of the working fluid on the low-pressure side of the recuperator.

15. A method for operating a pumped thermal energy storage ("PTES") system, the method comprising:
circulating a working fluid through a working fluid circuit; and
reducing a mass flow rate of the working fluid on a high-pressure side of a recuperator to balance a product of the mass and the specific heat of the working fluid on the high-pressure side and a low-pressure side of the recuperator while circulating the working fluid, the reducing including:
splitting the working fluid into a first portion and a second portion on the high-pressure side of the recuperator, the first portion being less than the second portion;
bypassing the high-pressure side of the recuperator with the first portion of the working fluid; and
circulating the second portion of the working fluid through the high-pressure side of the recuperator.

16. The method of claim 15, wherein bypassing the high-pressure side of the recuperator includes:
upon transferring heat between the working fluid and a high-temperature reservoir in a charging phase, bypassing the high-pressure side of a recuperator with the first portion of the working fluid and transferring heat from the first portion to a medium-temperature reservoir during the bypass while the second portion circulates through the recuperator, the first portion being less than the second portion; and
upon exiting a pump in a generating phase, bypassing the high-pressure side of the recuperator with a third portion of the working fluid while transferring heat from the medium-temperature reservoir to the third portion during the bypass while circulating a fourth portion of the working fluid through the recuperator.

17. The method of claim 15, further comprising exchanging heat between the second portion of the working fluid on the high-pressure side of the recuperator and a combined portion of the working fluid on the low-pressure side of the recuperator.

18. The method of claim 15, wherein reducing the mass flow rate of the working fluid on the high-pressure side of the recuperator to balance the product of the mass and the specific heat of the working fluid on the high-pressure side and the low-pressure side of the recuperator while circulating the working fluid further includes:
transferring heat to and from the first portion during the bypass; and
combining the first portion with the second portion after the second portion exits the recuperator.

19. The method of claim 18, wherein transferring heat to and from the first portion during the bypass includes transferring heat between the working fluid and a medium temperature thermal reservoir, further including:
in a charging phase, transferring heat from the working fluid to the medium temperature thermal reservoir; and
in a generating phase, transferring heat from the medium temperature thermal reservoir to the working fluid.

20. The method of claim 15, wherein circulating the working fluid through the working fluid circuit includes circulating carbon dioxide ($CO_2$).

21. The method of claim 15, wherein the first portion of the working fluid comprises approximately 40% of the total working fluid and the second portion comprises approximately 60% of the total working fluid.

22. The method of claim 15, wherein:
circulating the working fluid through the working fluid circuit includes circulating carbon dioxide ($CO_2$); and
the first portion of the working fluid comprises approximately 40% of the working fluid portion and the second portion comprises approximately 60% of the working fluid portion.

23. A pumped thermal energy storage ("PTES") system, comprising:
a low-temperature thermal reservoir;
a high-temperature thermal reservoir;
a medium-temperature thermal reservoir; and
a working fluid circuit configurable for a charging phase and a generating phase of a PTES operating cycle and through which, in use, a working fluid circulates, the working fluid circuit including:
a recuperator;
when in the charging phase:
an expander positioned between the recuperator and the low-temperature reservoir; and
a charge compressor positioned between recuperator and the high-temperature heat reservoir; and
when in the generating phase:
a pump positioned between recuperator and the low-temperature heat reservoir; and
a power turbine positioned between recuperator and the high-temperature heat reservoir; and
a bypass, by which, in both the charging phase and the generating phase, a first portion of the working fluid bypasses the high-pressure side of the recuperator and flows through the medium-temperature thermal reservoir, the medium-temperature thermal reservoir transferring heat between the working fluid and the medium-temperature thermal reservoir, while a second portion of the working fluid circulates through the recuperator.

24. The system of claim 23, wherein the working fluid is carbon dioxide ($CO_2$).

25. The system of claim 23, wherein the first portion is approximately 40% of the total working fluid and the second portion is approximately 60% of the total working fluid.

26. The system of claim 23, wherein:
the working fluid is carbon dioxide ($CO_2$);
the first portion is approximately 40% of the total working fluid; and
the second portion is approximately 60% of the total working fluid.

27. A method for operating a pumped thermal energy storage ("PTES") system, the method comprising:
circulating a high-heat capacity working fluid through a working fluid circuit including a recuperator; and
reducing a mass flow rate of the working fluid on a high-pressure side of the recuperator such that the product of mass and the specific heat capacity is the same on both the high-pressure side and a low-pressure side of the recuperator, including:
in a charging phase:
bypassing the recuperator with a first portion of the working fluid and transferring heat from the first portion to a medium-temperature reservoir during the bypass while circulating a second portion of the working fluid through the recuperator;
circulating a second portion through the recuperator while the first portion bypasses the recuperator and transferring heat from the second portion while circulating through the recuperator; and
circulating both the first portion and the second portion together through an expander after the first portion bypasses the recuperator and the second portion circulates through the recuperator; and
in a generating phase:
bypassing the recuperator with a third portion of the working fluid and transferring heat from the third portion to a medium-temperature reservoir during the bypass while circulating a fourth portion of the working fluid through the recuperator;
circulating a fourth portion through the recuperator while the third portion bypasses the recuperator and transferring heat to the fourth portion while circulating through the recuperator; and
circulating both the third portion and the fourth portion together through a high-temperature reservoir after the third portion bypasses the recuperator and the fourth portion circulates through the recuperator.

28. The method of claim 27, wherein the working fluid is carbon dioxide ($CO_2$).

29. The method of claim 28, wherein:
the first portion represents approximately 40%;
the second portion represents approximately 60% of the mass flow rate of the working fluid in the charging phase; and
the third portion represents approximately 40% and the fourth portion represents approximately 60% of the mass flow rate of the working fluid in the generating phase.

30. The method of claim 27, wherein:
the first portion represents approximately 40% and the second portion represents approximately 60% of the mass flow rate of the working fluid in the charging phase; and
the third portion represents approximately 40% and the fourth portion represents approximately 60% of the mass flow rate of the working fluid in the generating phase.

* * * * *

UNITED STATES PATENT AND TRADEMARK OFFICE
CERTIFICATE OF CORRECTION

| | | |
|---|---|---|
| PATENT NO. | : 11,629,638 B2 | Page 1 of 1 |
| APPLICATION NO. | : 17/546963 | |
| DATED | : April 18, 2023 | |
| INVENTOR(S) | : Timothy J. Held | |

It is certified that error appears in the above-identified patent and that said Letters Patent is hereby corrected as shown below:

In the Specification

Column 1, Line 3, please insert the following:
--STATEMENT REGARDING FEDERALLY SPONSORED RESEARCH OR DEVELOPMENT
This invention was made with government support under DE-AR0000996 awarded by the U.S. Department of Energy. The government has certain rights in the invention.--

Signed and Sealed this
Fifth Day of March, 2024

Katherine Kelly Vidal
*Director of the United States Patent and Trademark Office*